US010124893B1

(12) United States Patent
Aalund et al.

(10) Patent No.: US 10,124,893 B1
(45) Date of Patent: Nov. 13, 2018

(54) PROGNOSTICS AND HEALTH MANAGEMENT SYSTEM

(71) Applicant: Amazon Technologies, Inc., Seattle, WA (US)

(72) Inventors: Ryan Jeffrey Aalund, Issaquah, WA (US); Javier Alonso Lopez, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/708,013

(22) Filed: Sep. 18, 2017

(51) Int. Cl.
B64C 39/02 (2006.01)
G07C 5/00 (2006.01)
G08C 17/02 (2006.01)
G07C 5/08 (2006.01)

(52) U.S. Cl.
CPC ............ *B64C 39/024* (2013.01); *G07C 5/006* (2013.01); *G07C 5/008* (2013.01); *G07C 5/0808* (2013.01); *G07C 5/0816* (2013.01); *G08C 17/02* (2013.01); *B64C 2201/141* (2013.01); *B64C 2201/146* (2013.01)

(58) Field of Classification Search
CPC ............ B64C 39/024; B64C 2201/131; B64C 2001/146; B07C 5/006; B07C 5/008; B07C 5/0808; G08C 17/02
USPC .......................................................... 701/2
See application file for complete search history.

(56) References Cited

U.S. PATENT DOCUMENTS

| 2010/0235095 | A1* | 9/2010 | Smitherman | G01C 11/02 |
| | | | | 701/532 |
| 2018/0004207 | A1* | 1/2018 | Michini | G05D 1/0094 |
| 2018/0157255 | A1* | 6/2018 | Halverson | B64C 39/024 |

OTHER PUBLICATIONS

Barbieri et al., "Sensor-Based Degradation Prediction and Prognostics for Remaining Useful Life Estimation: Validation on Experimental Data of Electric Motors", *International Journal on Prognostics and Health Management*, No. 19, (2015), pp. 1-20.
Bartram et al., "Probabilistic Prognosis with Dynamic Bayesian Networks", *International Journal of Prognostics and Health Management*, No. 2 (2015), pp. 1-23.
Carden et al., "Vibration Based Condition Monitoring: A Review", *Structural Health Monitoring*, vol. 3, No. 4 (2004), pp. 355-377.
(Continued)

*Primary Examiner* — Tan Q Nguyen
(74) *Attorney, Agent, or Firm* — Kilpatrick Townsend & Stockton LLP

(57) ABSTRACT

Techniques are described for assessing the health of an unmanned vehicle such as an unmanned aerial vehicle (UAV). In some embodiments, sensors corresponding to subsystems of the UAV may be utilized to assess the health of a particular subsystem. Predictive models may be stored within memory of the UAV to enable such assessments to be performed at the UAV (e.g., during performance of a mission). Sensor data collected from sensors on the UAV may be provided as input for a predictive model associated with a particular subsystem. The predictive model may output a failure prediction indicating a likelihood, and in some cases, a time by which failure of the subsystem is predicted to occur given the sensor data. In some embodiments, one or more corrective actions may be identified and triggered based, at least in part, on the failure prediction.

20 Claims, 8 Drawing Sheets

(56) References Cited

OTHER PUBLICATIONS

Cardenas et al., "Beyond Theory: Towards a Probabilistic Causation Model to Support Project Governance in Infrastructure Projects", *International Journal of Project Management*, vol. 35, No. 3 (2017), pp. 432-450.

Chang, "Almost Instant Time Inference for Hybrin Partially Dynamic Bayesian Networks", *Transactions on Aerospace and Electronic Systems*, vol. 43, No. 1 (2007), pp. 13-22.

Chehade et al., "Sensory-Based Failure Threshold Estimation for Remaining Useful Life Prediction", *IEEE Transactions on Reliability* (2017), pp. 939-949.

Dagum et al., "An Optimal Approximation Algorithm for Bayesian Inference", *Artificial Intelligence*, vol. 93, No. 1, (1997), pp. 1-27.

Jacopino et al., "Modelling Imperfect Inspection and Maintenance in Defence Aviation through Bayesian Analysis of the KIJIMA Type I General Renewal Process (GRP)", *Reliability and Maintainability Symposium*, Newport Beach, (2006), pp. 470-475.

Katsouros et al., "A Bayesian Approach for Maintenance Action Recommendation", *International Journal of Prognostics and Health Management*, No. 34, (2013), pp. 1-6.

Kim et al., "Improved Reliability-Based Decision Support Methodolgy Applicable in System-Level Failure Diagnosis and Prognosis", *IEEE Transactions on Aerospace and Electronic Systems*, vol. 50, No. 4 (2014), pp. 2630-2641.

Krieg, "A Tutorial on Bayesian Belief Networks", DSTO Electronics and Surviellance Research Laboratory, Edinburgh, South Australia (2001), 64 pages.

Nannapaneni et al., "Mission-based Reliability Prediction in Component-based Systems", *International Journal of Prognostics and Health Management*, No. 3 (2016), pp. 1-14.

Pourali et al., "A Bayesian Approach to Online System Health Monitoring", *Reliability and Maintainability Symposium*, Orlando (2013), 6 pages.

Rosqvist et al., "Fatigue Analysis Framework for Fleet Management Using Bayesian Networks", *Reliability and Maintainability Symposium*, Newport Beach (2006), 26 pages.

Saxena et al., "Metrics for Offline Evaluation of Prognostic Performance", *International Journal of Prognostics and Health Management*, No. 1 (2010), pp. 1-20.

Schumann et al., "Towards Real-time, On-board, Hardware-supported Sensor and Software Health Management for Unmanned Aerial Systems", *International Journal of Prognostics and Health Management*, vol. 21 (2015), pp. 1-21.

Uebersax, John S. "Breast Cancer Risk Modeling: An Application of Bayes Nets", RavenPack International (2004), 9 pages.

Vichare et al., "Prognostics and Health Management of Electronics", *IEEE Transactions on Components and Packaging Technologies*, vol. 29, No. 1 (2006), pp. 222-219.

Wheeler et al., "A Survey of Health Management User Objectives in Aerospace Systems Related to Diagnostic and Prognostic Metrics", *International Journal of Prognostics and Health Management*, No. 3 (2010), 19 pages.

Xu et al., "Integrated System Health Management-Based Progressive Diagnosis for Space Avionics", *IEEE Transactions on Aerospace and Electronic Systems*, vol. 50, No. 2 (2014), pp. 1390-1402.

\* cited by examiner

PROGNOSTICS AND HEALTH MANAGEMENT SYSTEM

BACKGROUND

Unmanned vehicles may provide different operations, some of which may be autonomous and support various applications. For example, an unmanned aerial vehicle (UAV) may be used as an autonomous delivery vehicle associated with an electronic marketplace. The electronic marketplace may offer items and selectable delivery methods. Based on a selected delivery method, the UAV may be deployed to deliver a purchased item. The UAV may be configured to autonomously perform various delivery-related operations, such as autonomously flying between a source and a destination.

UAVs may experience failures of any number of subsystems as the result of wear or damage. Accordingly, various maintenance activities are required to prolong the life and effectiveness of the UAV. Traditionally, maintenance activities exhaustively include preventive maintenance and corrective maintenance. Corrective maintenance includes replacing broken parts after the useful life of the system is all consumed. This approach is not ideal for safety critical systems. Thus, a more preventive approach may be required. Traditional preventive maintenance sets a periodic interval to perform repairs regardless of health of the system. This strategy can be inefficient as these maintenance activities happen in intervals and some remaining life is unconsumed when replacement occurs. As part of preventive maintenance, a UAV may be inspected. However, inspection time reduces the availability of the UAV and may prove ineffective as certain failures are not easily discovered during inspection.

BRIEF DESCRIPTION OF THE DRAWINGS

Various embodiments in accordance with the present disclosure will be described with reference to the drawings, in which.

DETAILED DESCRIPTION

Figure 1:
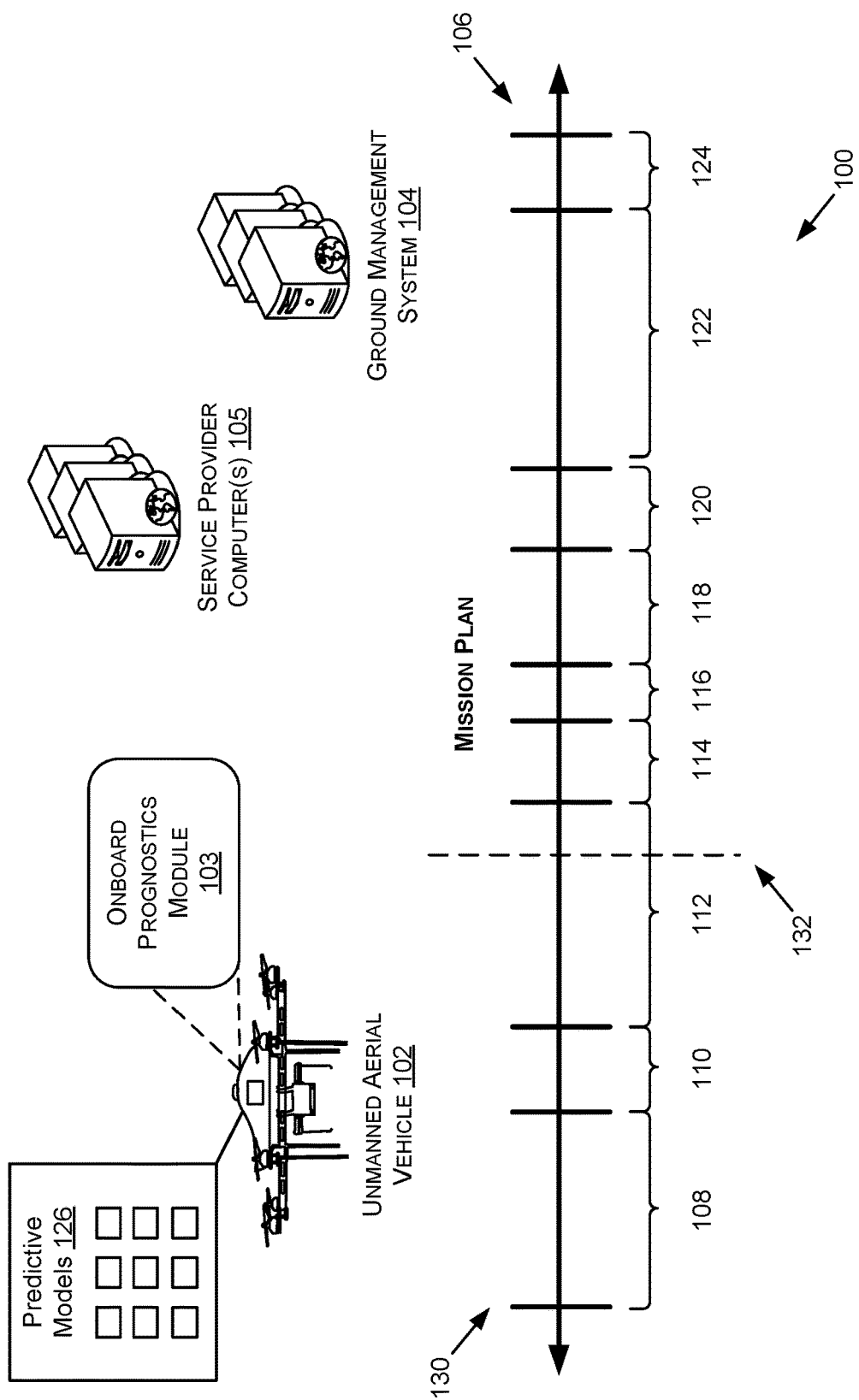
FIG. 1 illustrates an example environment for determining one or more corrective actions to be performed during a mission, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. It should be appreciated that although UAVs are utilized in a variety of examples herein, the same techniques and examples may be equally applied to other unmanned vehicles.

Embodiments of the present disclosure are directed to, among other things, determining whether one or more corrective actions are to be performed. In some cases, this determination may be based on an assessment of the real-time health of a UAV during execution of a mission plan, as well as a predicted a future state of one or more subsystems of the UAV.

As a non-limiting example, a UAV may be configured to perform autonomous operations during a mission. An autonomous operation may represent an operation that may be performed by the UAV independently and/or without control of an operator over the operation. A mission plan may be determined for a mission assigned to a UAV. The mission plan may include one or more stages that relate to a set of autonomous operations that may be performed by the UAV. By way of example, a mission plan may include any suitable number of stages directed to takeoff, initiating forward propulsion, inflight operations, landing, delivery, or any suitable combination of the above. The UAV may utilize a particular set of subsystems to perform operations associated with each stage of the mission plan. Failure of these subsystems during execution of the mission plan may jeopardize the mission and, in some cases, the components of the UAV and/or the UAV as a whole. Various techniques may be implemented to determine a time at which a failure of a subsystem is likely to occur (e.g., a failure prediction), such that one or more corrective actions may be executed to avoid damage to the UAV, the cargo carried by the UAV, bystanders, property, or any combination of the above. "Failure" is intended to refer to a performance level that falls below a predetermined performance threshold, falls within a predetermined range, and/or meets a predetermined set of criteria.

As the UAV performs operations during a stage of the mission plan, sensor data may be collected by sensors identified as being associated with subsystem(s) used to perform those operations. Although not an exhaustive list, the UAV may include sensors configured to collect data related to external forces, strain, structural integrity, vibration, temperature, humidity, electric current, voltage, rotations per minute (or other suitable rotation rate), imagery, or the like. In some cases, only a subset of the subsystems of the UAV may be associated with the stage currently being executed. For example, during a takeoff stage of a mission plan, the stresses performed on the structure of the UAV as well as the propulsion and power subsystems may be of particular interest. Accordingly, a set of sensors may be identified for each subsystem (e.g., structure, propulsion, and power) utilized during takeoff. Corresponding sets of sensors may be identified for each of the stages of the mission plan. The identified set of sensors for one stage may be the same or different than the set of sensors identified for another stage. Although some sensor data of any number of sensors may be collected at any suitable time during the mission, the sensor data of the identified set of sensors (e.g., pertaining to critical subsystems) may be immediately analyzed, while other, less critical sensor data may be stored for future analysis (e.g., by a ground management system separate from the UAV).

During execution of the operations associated with the stage (e.g., takeoff), sensor data may be collected from the identified sensors (e.g., corresponding to subsystem(s) used to perform takeoff operations). The UAV may be configured to store in local memory at least one predictive model associated with the system and/or each subsystem. The stored predictive model(s) may be trained utilizing historical data of the UAV and/or a group of UAVs to predict failure of the system and/or subsystem. In some embodiments, the predictive model(s) may be generated using a Bayesian Belief Network (for mapping relationships between all variables in a complex system) and/or techniques associated with physics of failure (e.g., degradation algorithms used to describe how mechanical, chemical, structural, electrical components degrade over time).

By way of example, a single subsystem may be associated with multiple predictive models. One model may be generated based on supervised machine learning techniques and historical data associated with the UAV. Another model may be generated based on supervised machine learning techniques and historical data associated with a collection of UAVs. Yet another model may be generated using a Bayesian Belief Network. Still another model may be based on techniques associated with physics of failure. The collected sensor data may be used as input for any suitable combination of the predictive model(s) associated with the system/subsystem to produce an output corresponding to a likelihood and/or time by which (or a time period within which) the system/subsystem is likely to fail. In some embodiments, the outputs (e.g., failure predictions) of multiple predictive models may be combined (e.g., averaged, weighted and combined, etc.) to produce a single output (e.g., a single failure prediction). An example output of the predictive model(s) (e.g., a failure prediction) may indicate that the propulsion subsystem of the UAV has an 80% likelihood of failing (dropping below a performance threshold) within the next five minutes. Similar techniques may be employed to determine a failure prediction for the UAV as a whole utilizing predictive model(s) associated with UAVs (e.g., the same type of UAVs, UAVs generally, etc.).

Based on the output of the predictive model(s), one or more corrective actions may be identified and executed. For example, execution of a corrective action may cause the UAV to perform an immediate landing, return to a takeoff location, send a notification to a remote system, request instructions, request remote control from a ground management system, transfer operations to a redundant system, or the like. By monitoring the performance of these subsystems in real-time, and predicting when these subsystems are likely to fail, damage to the UAV, the UAV's cargo, innocent bystanders, and personal property resulting from system/subsystem failure may be reduced or eliminated.

As a non-limiting example, if a failure is predicted, the UAV may be configured to perform a variety of corrective actions in a preventative manner before the failure is predicted to occur (or actually occurs). In some examples, the corrective actions may be identified based on the failure prediction (indicating a type of failure and/or the time by which the failure is predicted to occur). A corrective action may include modifying any suitable portion of a mission plan such that a deviation of the mission plan occurs. In one example, the UAV may cause a notification of the failure prediction to be provided to another device separate from the UAV (e.g., a ground management system). In another example, the UAV may report the failure prediction to a ground management system and may enable remote control from the ground management system over operations of the UAV. In yet another example, the UAV may be configured to deviate from its original course/speed and/or to perform an unscheduled landing.

During execution of a mission plan, the UAV may be configured to update any suitable combination of the predictive models stored in its local memory. As a non-limiting example, the UAV may be configured to cause a predictive model associated with a particular subsystem to be regenerated or updated using collected sensor data and/or corrective action data (e.g., data related to one or more corrective actions performed by the UAV). Additionally, or alternatively, the UAV may provide mission performance data (e.g., mission data, sensor data, corrective actions performed, failure predictions, etc.) to a ground management system at any suitable time. For example, upon mission completion, the UAV may transmit any portion of the mission performance data. In some examples, the ground management system may be configured to maintain one or more predictive models trained on historical mission performance data of the UAV and/or a group of UAVs. The ground management system may update its predictive models by retraining the models using the mission performance data received from the UAV. Any suitable combination of the updated models may be provided to the UAV and/or group of UAVs at any suitable time (e.g., before executing another mission plan). In some embodiments, the predictive models maintained by the ground management system may be associated with the same or different subsystems than the predictive models stored in local memory and maintained by the UAV.

As described above, the UAV may utilize multiple predictive models associated with a common subsystem to determine a failure prediction. One predictive model may require less processing, memory, and power in order to perform its operations than a second predictive model. In some cases, the second predictive model may be more accurate than the first predictive model. Each predictive model may utilize the same, or a different, set of sensor data as input. In some embodiments, the UAV may utilize the first, less resource intensive, predictive model to determine a failure prediction. If that failure prediction indicates that a failure is likely to occur within some period of time, the second predictive model may be utilized by the UAV to determine a more accurate failure prediction. Accordingly, the UAV may reserve its resources for performing more advance failure predictions only when a less resource intensive predictive model has indicated that a failure may occur.

In some embodiments, the UAV may determine a failure prediction (e.g., a time at which a subsystem is likely to fail) utilizing the predictive models in a similar manner as described above. The UAV may then send the failure prediction and the collected sensor data used as input for the predictive model(s) to a ground management system. In some examples, the ground management system may utilize one or more predictive models accessible to the ground management system to determine its own failure prediction. The ground management system may then provide a response to the UAV indicating that the failure prediction provided by the UAV was accurate (e.g., was substantially the same as the failure prediction of the ground management system) or inaccurate (e.g., was not substantially the same as the failure prediction of the ground management system). In some cases, the UAV may perform corrective actions only after receiving a response indicating that its failure prediction was accurate.

Turning to FIG. 1, the figure illustrates an example environment 100 for determining one or more corrective actions to be performed during a mission, according to embodiments. By way of example, the service provider computer(s) 105 may be configured to host an electronic marketplace in which an item may be purchased. The service provider computers may include any suitable device configured to host a web site (or combination of web sites). The web site may be accessible via a web browser and may enable the users to place orders for items offered via the web site.

The UAV 102 may be configured to perform a mission (e.g., to deliver the item from a source location to a destination location). At least a portion of the mission may include autonomous operations that are performed independent of interaction with ground management system 104 (e.g., a system responsible for managing one or more UAVs including the UAV 102). By way of example, the ground management system 104 may perform operations to select the UAV 102 for a particular mission. Subsequent to selection, the ground management system 104 may provide the UAV 102 with mission data such as, but not limited to, payload information (e.g., attributes associated with the item to be delivered), route information, navigation information, a source location, a destination location, a delivery time, or the like.

The onboard prognostics module 103, a component of the UAV 102, may be configured to determine a mission plan that includes one or more stages for autonomously performing mission operations. For example, the UAV 102 may determine that the mission plan 106 may include any suitable number of stages (e.g., stages 108-124). Each of the stages 108-124 may correspond to a portion of the mission plan 106 and may be associated with one or more subsystems of the UAV 102. Each of the subsystems of the UAV 102 may be associated with some subset of the predictive models 126 stored in local memory of the UAV 102.

As a non-limiting example, the stage 108 may be associated with takeoff at a source location; Stage 110 may be associated with initializing a propulsion subsystem of the UAV 102; Stage 112 may be associated with in-flight operations of the UAV 102 as the UAV travels from the source location towards a destination location; Stage 114 may be associated with landing at a destination location; Stage 116 may be associated with delivery of a payload (e.g., an item offered on a web site hosted by service provider computer(s) 105) at the destination location (e.g., the home of a purchaser of the item); Stage 118 may be associated with a takeoff at the destination location; Stage 120 may be associated with initializing a propulsion subsystem of the UAV 102; Stage 122 may be associated with in-flight operations of the UAV 102 as the UAV travels from the destination location towards the source location; Stage 124 may be associated with landing at the source location upon return. The mission plan 106 and corresponding stages 108-124 of FIG. 1 are intended to be illustrative in nature and it should be appreciated that other mission plans that include the same or different number and combinations of the stages 108-124 are equally possible.

In an example, the source location may be a fulfillment center associated with an electronic marketplace. The fulfillment center may include a warehouse, a storage facility, or some other source from which the item may be available. Generally, the electronic marketplace may offer and facilitate purchases and deliveries of the item (or units thereof) from the source location. A set of computing resources or system (e.g., the service provider computer(s) 105) may be configured to facilitate the electronic marketplace. For example, the service provider computer(s) 105 may host an electronic platform for the electronic marketplace. The electronic platform may include a front end system, such as a web site of the electronic marketplace, to offer the item and different delivery methods.

In some embodiments, a user may use a computing device (not shown) to interact with the front end system to purchase the item and select a delivery method. The user may also provide information, such as location information, about a destination location. The destination location may represent an area or location to which the item should be delivered. The electronic platform may also include a back end system to process orders of the item. For example, the back end system may manage or control the handling of the item in the source location (e.g., the fulfillment center). The service provider computer(s) 105 may be configured to provide mission data to the ground management system 104.

The UAV 102 may be selected for the mission by the ground management system 104 using any suitable selection method. Once selected, the ground management system 104 may provide the UAV 102 mission data for the mission (received from the service provider computer(s) 105). Upon receiving the mission data, the UAV 102 may identify the mission plan using the mission data. In some cases, the UAV 102 may determine the mission plan based on received mission data, while in others, the mission plan may be provided to the UAV 102 by the ground management system 104. The UAV 102 may begin performing the mission plan at 130 by commencing performance of the operations associated with stage 108 (e.g., takeoff). The onboard prognostics module 103 may be configured to identify a set of sensors associated with subsystems used to perform the operations of the stage 108.

During execution of the operations of stage 108, the onboard prognostics module 103 may cause sensor data from the identified set of sensors to be collected. The onboard prognostics module 103 may utilize the collected sensor data as input for the predictive models 126. The predictive models 126 may each provide output indicating a likelihood that a corresponding subsystem will experience a failure in a particular period of time. If the likelihood is lower than a predetermined performance threshold (e.g., 75% of normal subsystem output, 50% of normal subsystem output, etc.) then the UAV 102 may continue operations. As sensor data is collected, or at any suitable time during the mission, the onboard prognostics module 103 may be configured to retrain any suitable number of the predictive models 126 using the collected sensor data. Accordingly, the predictive models 126 may include near real-time sensor data of the UAV 102 when assessing the health of the UAV 102 and/or predicting a future state of the UAV 102.

In the illustrative example of FIG. 1, the UAV 102 may complete takeoff (e.g., operations associated with stage 108), initiate forward propulsion (e.g., operations associated with stage 110), and continue to performing inflight operations (e.g., associated with stage 112). During inflight operations, the UAV 102 may utilize various subsystems (e.g., avionics, propulsion, power, structure, navigation) to autonomously navigate toward the destination location. While inflight, the UAV 102 may collect sensor data (e.g., temperature data, strain/structural integrity data, vibration data, humidity data, electrical current readings, rotations per second/minute, external force data, and the like) associated with each of the subsystems corresponding to the stage 112. The collected sensor data may periodically (e.g., as collected) be input into the predictive models 126 (e.g., models corresponding to each of the subsystems) and the output of the predictive models 126 may be analyzed by the onboard prognostics module 103.

At time 132, the onboard prognostics module 103 may determine that the output of the predictive models 126 has indicated that a likelihood of failure of a subsystem has breached a predetermined threshold (e.g., 80% likely, 90% likely, etc.). Additionally, the output may indicate a period of time by which the failure is predicted to occur (e.g., 30 seconds, five minutes, two hours, three days, etc.). The onboard prognostics module 103 may identify one or more corrective actions based on the output (e.g., the likelihood and/or the period of time). As a non-limiting example, the one or more corrective actions may be identified from a set of potential corrective actions based on the sensor data, mission plan, item information (e.g., item weight, fragility, etc.), specification information associated with the UAV 102 (e.g., type of UAV 102, particular mechanical features of the UAV 102, particular subsystems included on the UAV 102, etc.), a failure prediction (e.g., output from a predictive model including a likelihood that a particular failure may occur within a particular time period), and the like. Additional descriptions of specific corrective action identification will be discussed further below in connection with FIG. 5.

By way of example, the onboard prognostics module 103 may determine from the predictive model output that a failure to the propulsion system is 95% likely to occur within the next ten minutes. Based on the current location of the UAV 102, the onboard prognostics module 103 may determine that six minutes are required to return to the source location. In some embodiments, based on the imminent failure and the time required to return to the source location, the UAV 102 may determine that returning to the source location is the most advantageous corrective action and may perform operations to execute the same.

It may be the case that the UAV 102 has traveled too far from the source location to return before failure is predicted to occur. If the UAV 102 may reach and land at the destination location before failure is predicted to occur (e.g., with over some threshold of predicted success), the onboard prognostics module 103 may cause the UAV 102 to continue the mission, but alter the mission plan such that the UAV 102 does not takeoff after landing at the destination location.

In yet another example, if the source location and the destination location are likely too far away for the UAV 102 to reach before the failure is predicted to occur, the onboard prognostics module 103 may determine that the most advantageous corrective action is to conduct an unscheduled landing. In this case, the onboard prognostics module 103 may cause the UAV 102 to perform operations for identifying a new landing location based on any suitable combination of sensor data and navigation information accessible to the UAV 102.

In some examples, the onboard prognostics module 103 may provide one or more notifications of the impending failure as a corrective action. The notification(s) may indicate the output of the predictive models 126 and/or the one or more corrective actions to be performed. In some cases, a notification may indicate a request. For example, a notification may be sent to the ground management system 104 requesting instructions, requesting remote control, requesting authorization to land at a location designated in the notification, etc. The ground management system 104 may be configured to send a response to the notification that provides the instructions and/or authorization requested.

Figure 2:
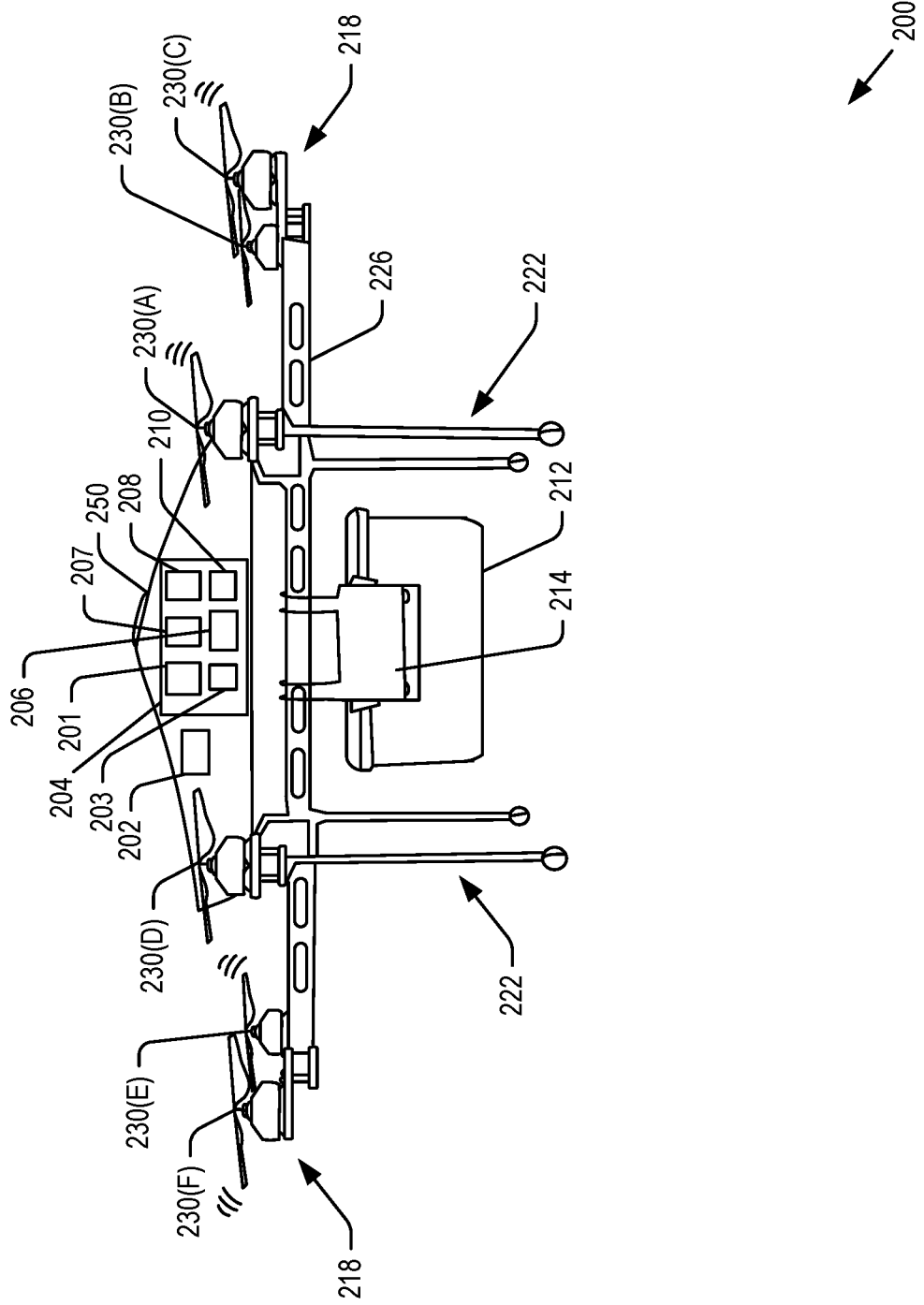
FIG. 2 illustrates an example UAV configuration, according to embodiments.

To perform a variety of mission-related tasks, a UAV may rely on a combination of a computer system, navigation sensors, optical sensors, and network interfaces. FIG. 2 illustrates an example configuration of a UAV 200 (e.g., the UAV 102) with such components. In some embodiments, the UAV 200 may be configured to deliver an item. The UAV 200 may perform an autonomous operations associated with the delivery. These autonomous operations may be tasks associated with one or more stages of a mission plan. As discussed above, a mission plan may include multiple stages individually associated with takeoff, initiating forward propulsion, in-flight travel, destination detection, landing, and delivery. In some cases, such as in the case in which a UAV travels to a destination and back to a source location, the mission plan may include multiple instances of at least some of these stages. It should be appreciated that the stages discussed herein are not an exhaustive recitation of every possible stage and/or combination of stages. Rather, a mission plan may include any suitable number and combination of stages associated with performing autonomous mission operations.

The UAV 200 may be designed in accordance with commercial aviation standards and may include multiple redundancies to ensure reliability. In particular, the UAV 200 may include a plurality of systems or subsystems operating under the control of, or at least partly under the control of, a management component 202.

The management component 202 may be configured to mechanically and/or electronically manage and/or control various operations of other components of the UAV 200. For example, the management component 202 may include various sensing, activating, and monitoring mechanisms to manage and control the various operations. For instance, the management component 202 may include or interface with an onboard computing system 204 hosting a management module for autonomously or semi-autonomously controlling and managing various operations of the UAV 200 and, in some examples, for enabling remote control by a pilot. The various operations may also include managing other components and subsystems of the UAV 200, such as an sensor system 201, vision system 203, an avionics system 206 to facilitate navigation, a propulsion system 218 to facilitate flights, a structure system (including frame 226 and landing structure 222), a power system 207, a payload holding mechanism 212 to facilitate holding a payload (e.g., a package), and/or a payload releasing mechanism 214 to facilitate release and delivery of the payload. In at least one embodiment, the management component 202 provides the functionality described above in connection with the onboard prognostics module 103 of FIG. 1.

The sensor system 201 may include accelerometer(s), gyroscope(s), thermostat(s), vibration sensor(s), stress gauge(s), strain gauge(s), structural integrity sensor(s), external force sensor(s), humidity sensor(s) electrical current sensor(s), voltage sensor(s), rotation sensor(s) (e.g., for determining rotations per minute (RPM) of a mechanical device such as a propeller), and the like. The sensor system 201 may be collocated. At least part of the sensor system 201 may be dispersed in various locations on the UAV 200. As a non-limiting example, a suitable combination of external force sensors, stress gauges, strain gauges (e.g., embedded in carbon fiber), structural integrity sensors, and/or vibration sensors may be located on the frame 226 and/or the landing structure 222. A suitable combination of thermostat(s), vibration sensor(s), humidity sensor(s), electrical current sensor(s), voltage sensor(s), rotation sensors, and external force sensor(s) may be located at various locations of the propulsion system 218. A suitable combination of thermostat(s), vibration sensor(s), humidity sensor(s), electrical current sensor(s), and/or voltage sensors may be located within the avionics system 206. A suitable combination of thermostat(s), vibration sensor(s), humidity sensor(s), electrical current sensor(s), and voltage sensors may be located within the vision system 203. A suitable combination of thermostat(s), electrical current sensor(s), and voltage sensors may be located within the power system 207. At least some of the sensors of the sensor system 201 may be configured to collect sensor data pertaining to a particular subsystem of the UAV 200.

Portions of the management component 202, including mechanical and/or electronic control mechanisms may be housed under the top cover 250 or distributed within other components such as the payload holding mechanism 212 and the payload releasing mechanism 214. In a further example, components remote from the UAV 200 may be deployed and may be in communication with the management component 202 to direct some or all of the operations of the management component 202. These remote components may also be referred to as a management component.

In an example, the power system 207 may include a power supply and assemblies (e.g., rechargeable battery, liquid fuel, and other power supplies) (not shown). The avionics system 206 may include one or more communications links and antennas (e.g., modem, radio, network, cellular, satellite, and other links for receiving and/or transmitting information) (not shown), one or more navigation devices and antennas (e.g., global positioning system (GPS), an inertial navigation system (INS), a range finder, a Radio Detection And Ranging (RADAR), and other systems to aid in navigating the UAV 200 and detecting objects) (not shown), and a radio-frequency identification (RFID) capability (not shown). The vision system 203 may be positioned on top cover 250 or on the frame 226 of UAV 200. Although not shown, one or more image capture devices of the vision system 203 may be mounted in different directions (e.g., downward looking cameras to identify ground objects and/or a landing zone for a payload while UAV 200 is in flight).

The UAV 200 may also include the onboard computing system 204. In an example, the onboard computing system 204 may be integrated with the management component 202. In another example, the onboard computing system 204 may be separate from but may interface with the management component 202. The onboard computing system 204 may be configured to provide an electronic control of various operations of the UAV 200, including the ones provided by the onboard prognostics module 103 of FIG. 1. In an example, the onboard computing system 204 may also process sensed data by one or more other components of the UAV, such as the sensors of sensor system 201. In a further example, the onboard computing system 204 may also electronically control components of the payload holding mechanism 212 and/or the payload releasing mechanism 214. In another example, the onboard computing system 204 may also electronically control components of the UAV 200 such as a plurality of propulsion devices, a few of which, 230(A)-230(F) are included in FIG. 2.

The onboard computing system 204 may host the management module configured to provide management operations of the flight and/or other portions of a mission (e.g., a delivery of an item, pick-up of an item, landing location detection, takeoff, landing, etc.) of the UAV 200. For example, the data management module may analyze one or more images captured by the vision system 203, determine an appropriate delivery surface, determine a distance by which to lower a payload, a speed of lowering the payload, direct the propulsion system to position the UAV 200 according to this data, activate a release of a package from the payload holding mechanism 212, activate a release of a cable, and/or activate other functions of the mission.

In some embodiments, the management component 202 may perform any suitable operations discussed in connection with the onboard prognostics module 103 of FIG. 1. The specific operations performed by the onboard prognostics module 103 will be discussed further with respect to FIG. 3.

In some embodiments, the storage device 208 may be configured to store any operational data of the UAV 200. For example, sensor data collected from any number of the sensor system 201 may be stored in the storage device 208. The storage device 208 may be configured to store one or more predictive models, one or more corrective actions, mission data (e.g., mission plan, stages, etc.) or any suitable data discussed in connection with the onboard prognostics module 103.

The interface 210 may represent an interface for exchanging data as part of managing and/or controlling some of the operations of the UAV 200. In an example, the interface 210 may be configured to facilitate data exchanges with the management component 202, other components of the UAV 200, and/or other components remote from the UAV 200. As such, the interface 210 may include high speed interfaces, wired and/or wireless, serial and/or parallel, to enable fast upload and download of data to and from the onboard computing system 204.

As shown in FIG. 2, the UAV 200 may also include the payload holding mechanism 212. The payload holding mechanism 212 may be configured to hold or retain a payload. In some examples, the payload holding mechanism 212 may hold or retain the payload using friction, vacuum suction, opposing arms, magnets, holding, and/or other retaining mechanisms. As illustrated in FIG. 2, the payload holding mechanism 212 may include a compartment configured to contain the payload. In another example, the payload holding mechanism 212 may include two opposing arms configured to apply friction to the payload. The management component 202 may be configured to control at least a portion of the payload holding mechanism 212. For example, the management component 202 may electronically and/or mechanically activate the payload holding mechanism 212 to hold and/or release the payload. In an example, the payload may be released from the payload holding mechanism 212 by opening the compartment, pushing the payload, moving one or both of the opposing arms, and/or stopping an application of friction, vacuum suction, and/or magnetic force.

The UAV 200 may also include the payload releasing mechanism 214. In an example, the payload releasing mechanism 214 may be integrated with the payload holding mechanism 212. In another example, the payload releasing mechanism may be separate from the payload holding mechanism 212. In both examples, the payload releasing mechanism 214 may be configured to lower, using a cable, a payload released from the payload holding mechanism 212 and to release the cable once the payload is lowered by a distance.

As such, the payload releasing mechanism 214 may include a lowering mechanism and a release mechanism. For example, the lowering mechanism may include a cable and/or an electronic or mechanical control configured to lower the cable at a controlled speed. For example, this control may include a winch, a spool, a ratchet, and/or a clamp. The cable may couple the payload with the UAV 200. For example, one end of the cable may be connected, attached, or integral to the payload. Another end of the cable may be coupled to one or more components of the payload releasing mechanism 214, the payload holding mechanism 212, the frame of the UAV 200, and/or other component(s)

of the UAV 200. For example, the cable may be coiled around the winch or spool or may be stowed or coiled inside the compartment (if one is used as part of the payload holding mechanism 212). The cable may have a configuration selected based on the mission of the UAV 200, the mass of the payload, and/or an expected environment associated with the delivery location (e.g., the potential interference).

In an example, the release mechanism may be integrated with the lowering mechanism. In another example, the release mechanism may be separate from the lowering mechanism. In both examples, the release mechanism may be configured to release the cable when the payload may have been lowered by a certain distance. Releasing the cable may include severing the cable, weakening the cable, and/or decoupling the cable from the UAV 200 (e.g. from the payload releasing mechanism 214) without severing or weakening the cable.

To sever the cable, the release mechanism may include a sharp surface, such as a blade to, for example, cut the cable when applied thereto. To weaken the cable, the release mechanism may include a sharp head, edge, and/or point, such as a hole puncher, or a friction surface to cause a damage to the integrity of the structure of the cable. Other release mechanisms may also be used to sever or weaken the cable. An example may include a mechanism configured to apply a thermoelectric effect to the cable. For instance, a contact surface, such as one using an electrical conductor, may be configured to release heat upon application of a voltage. The contact surface may come in contact with the cable or may be integrated within different sections of the cable. Upon application of the voltage, the contact surface may sever or weaken the cable by applying heat to the cable. To decouple the cable from the UAV 200, the cable may be in the first place insecurely coupled to the UAV 200 such that, upon an unwinding of the cable, the cable may become detached from the UAV 200. For example, the cable may be coiled around the winch or spool without having any of the cable ends attached to the winch or spool or to another component of the UAV 200. In another example, the cable may be coupled to a component of the UAV 200 through a weak link such that upon a tension generated based on the mass of the payload, the link may be broken to free the cable from the UAV 200.

The release mechanism may be electronically or mechanically controlled. This control may be effected based on, for example, the distance by which the payload may have been lowered and/or based on an amount of a tension of the cable, an increase in the amount, a decrease in the amount, or a sudden or fast change in the amount. Various configurations may be used to measure the distance, the amount of tension, and the change in the amount. For example, the distance may be determined from the number of rotations of a winch or spool if one is used or based on a distance or cable length sensor. The amount of the tension and the change in the amount may be determined based on spring-based or electronic-based sensors.

Further, the release mechanism may be electronically activated based on a signal generated in response to detecting that the distance may have been travelled and/or the amount or change in the amount of tension. In another example, the release mechanism may be activated based on a mechanical configuration. For example, as the cable may be lowered, a ratchet may load a spring that may be coupled to release mechanism. Upon the load exceeding a threshold, the spring may be released, thereby activating the release mechanism. In another example, a tension of the cable may be used to hold the release mechanism away from the cable. As soon as the tension changes (e.g., the cable becomes loose indicating that the payload may be resting on the ground), the release mechanism may be activated to sever or weaken the cable.

Further, the UAV 200 may include a propulsion system 218. In some examples, the propulsion system 218 may include rotary blades or otherwise be a propeller-based system. As illustrated in FIG. 2, the propulsion system 218 may include a plurality of propulsion devices, a few of which, 230(A)-230(F), are shown in this view. Each propeller device may include one propeller, a motor, wiring, a balance system, a control mechanism, and other features to enable flight. In some examples, the propulsion system 218 may operate at least partially under the control of the management component 202. In some examples, the propulsion system 218 may be configured to adjust itself without receiving instructions from the management component 202. Thus, the propulsion system 218 may operate semi-autonomously or autonomously.

The UAV 200 may also include landing structure 222. The landing structure 222 may be adequately rigid to support the UAV 200 and the payload. The landing structure 222 may include a plurality of elongated legs which may enable the UAV 200 to land on and take off from a variety of different surfaces. The plurality of systems, subsystems, and structures of the UAV 200 may be connected via frame 226. The frame 226 may be constructed of a rigid material and be capable of receiving via different connections the variety of systems, sub-systems, and structures. For example, the landing structure 222 may be disposed below the frame 226 and, in some examples, may be formed from the same material and/or same piece of material as the frame 226. The propulsion system 218 may be disposed radially around a perimeter of the frame 226 or otherwise distributed around the frame 226. In some examples, the frame 226 may attach or be associated with one or more fixed wings.

Figure 3:
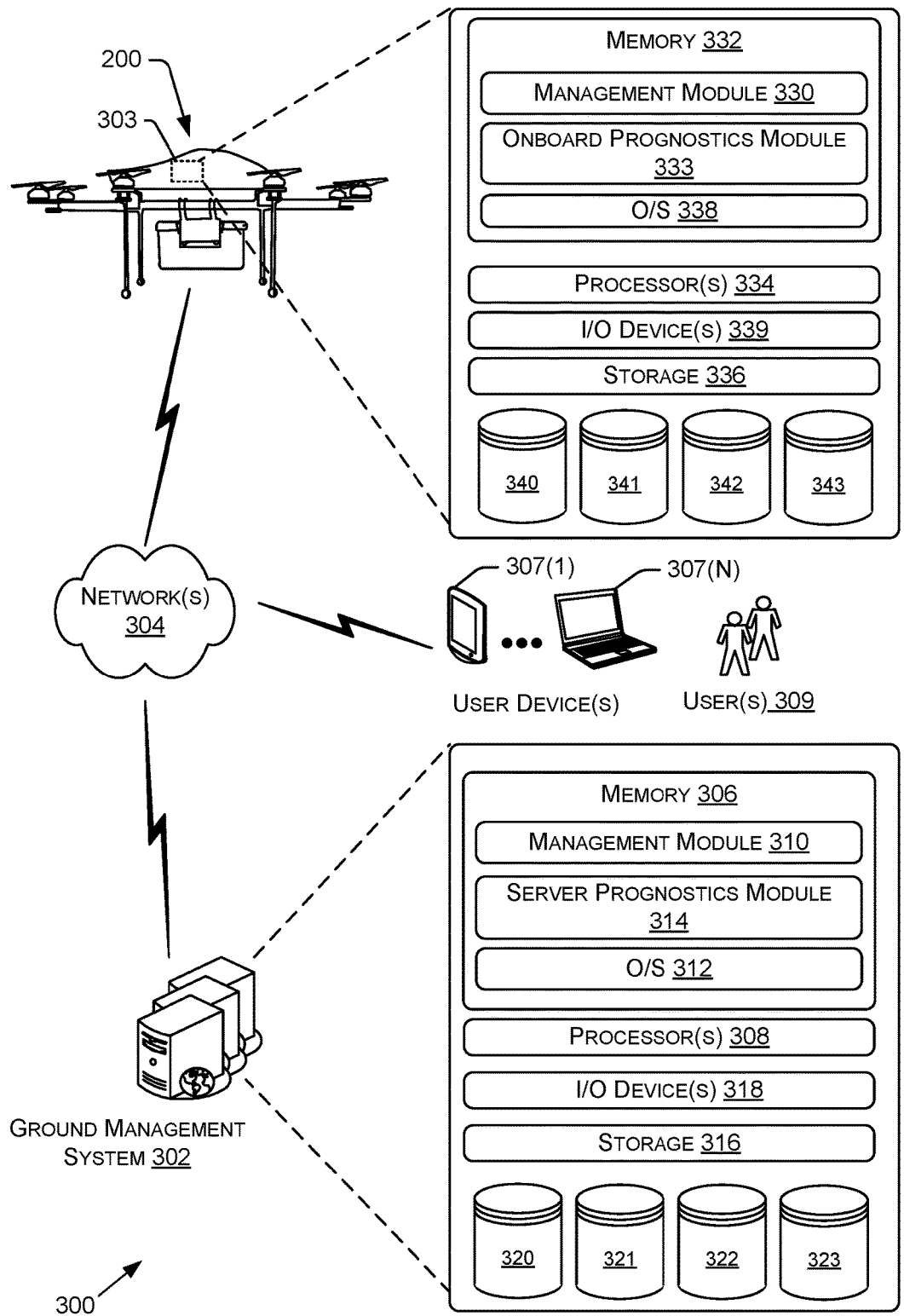
FIG. 3 illustrates an example computing system that may include an unmanned vehicle and a ground management system, according to embodiments.

FIG. 3 illustrates an example computing system 300 that may include an unmanned vehicle (e.g., UAV 200) and a ground management system 302 (e.g., the ground management system 104 of FIG. 1), according to embodiments. Although not shown, the computing system 300 may include service provider computers (e.g., the service provider computer(s) 105 of FIG. 1) that may support an electronic marketplace and interface with delivery services provided by the ground management system 302. The ground management system 302 may coordinate delivery of items via UAVs, such as UAV 200, to customers of the electronic marketplace. In some examples, the service provider computer(s) 105 may be a stand-alone service operated on its own or in connection with an electronic marketplace. The ground management system 302 may be configured to communicate with the UAV 200 via the network 304. The network 304 may include any one or a combination of many different types of networks, such as cable networks, the Internet, wireless networks, cellular networks, radio networks, and other private and/or public networks. The ground management system 302 may be configured to provide back-end control of the UAV 200 prior to, during, and/or after completion of a mission plan. In some examples, the UAV 200 may be configured to accomplish its mission plan (e.g., delivery of an item) with little to no communication with the ground management system 302.

User devices 307(1)-307(N) (hereinafter, "the user device 307") may also be in communication with the service provider computer(s) 105 via the network 304. The user device 307 may be operable by one or more users 309 (hereinafter, "the users 309") to access the service provider computers 105 (or an electronic marketplace). The user device 307 may be any suitable device capable of communicating with the network 304. For example, the user device 307 may be any suitable computing device such as, but not limited to, a mobile phone, a smart phone, a personal digital assistant (PDA), a laptop computer, a thin-client device, a tablet PC, a desktop computer, a set-top box, or other computing device. In some examples, the user device 307 may be in communication with the service provider computer(s) 105 via one or more web servers constituting an electronic marketplace (not shown) connected to the network 304 and associated with the service provider computer(s) 105.

Turning now to the details of the ground management system 302, the ground management system 302 may be communicatively coupled to a service provider computer (e.g., the service provider computer(s) 105 of FIG. 1, not shown in FIG. 3). In some embodiments, the ground management system 302 may be configured to provide the functionality described herein in connection with service provider computers. The ground management system 302 may be in communication with the UAV 200 to facilitate a delivery of an item ordered from the electronic marketplace. This communication may occur over the network 304. Facilitating the delivery may include selecting the UAV 200 for deployment, providing mission data (e.g., route information, payload information, destination location, item information, etc.) as part of the deployment, deploying the UAV 200, monitoring the flight of the UAV 200, exchanging information regarding potential failures and/or potential corrective actions, and/or providing remote controls over certain operations of the UAV 200 as needed.

In one illustrative configuration, the ground management system 302 (or the hosting computer system) may include at least one memory 306 and one or more processing units (or processor(s)) 308. The processor(s) 308 may be implemented as appropriate in hardware, computer-executable instructions, software, firmware, or combinations thereof. Computer-executable instruction, software, or firmware implementations of the processor(s) 308 may include computer-executable or machine-executable instructions written in any suitable programming language to perform the various functions described. The memory 306 may include more than one memory and may be distributed throughout a plurality of a network of servers. The memory 306 may store program instructions (e.g., a management module 310) that are loadable and executable on the processor(s) 308, as well as data generated during the execution of these programs. Depending on the configuration and type of memory, the memory 306 may be volatile (such as random access memory (RAM)) and/or non-volatile (such as read-only memory (ROM), flash memory, or other memory).

The ground management system 302 (or the hosting computer system) may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 306 may include multiple different types of memory, such as static random access memory (SRAM), dynamic random access memory (DRAM), or ROM.

Turning to the contents of the memory 306 in more detail, the memory 306 may include an operating system 312 and one or more application programs, modules or services for implementing the features disclosed herein including at least the management module 310 and the server prognostics module 314. The management module 310, in some examples, may support, direct, manage, and/or control operations of some or all of the components of the UAV 200. For instance, the management module 310 may transmit data to the UAV 200 associated with a delivery of an item by the UAV 200. Such data may include flight route information (e.g., source location, destination location, flight path, checkpoints along the path, etc.) and may be used by the UAV 200, such as by the management module 310, to deliver the item. Furthermore, the management module 310 may be used to select and deploy the UAV 200 on a delivery mission. The management module 310 may also receive data from the UAV 200 during the deployment and/or execution of the delivery mission. The management module 310 may process that data and provide, as applicable, further instructions to the UAV 200 to adjust the flight route, perform a corrective action, and/or adjust the delivery of the item.

The functionality of the server prognostics module 314 will be discussed further in connection with FIG. 4.

In some examples, the ground management system 302 (or the hosting computer system) may also include additional storage 316, which may include removable storage and/or non-removable storage. The additional storage 316 may include, but is not limited to, magnetic storage, optical disks, and/or tape storage. The disk drives and their associated computer-readable media may provide non-volatile storage of computer-readable instructions, data structures, program modules, and other data for the computing devices.

The memory 306 and the additional storage 316, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computer systems (e.g., processors). The modules of the ground management system 302 may include one or more components. The ground management system 302 may also include I/O device(s) and/or ports 318, such as for enabling connection with a keyboard, a mouse, a pen, a voice input device, a touch input device, a display, speakers, a printer, or other I/O device.

The ground management system 302 may also include sensor data store 320, mission data store 321, corrective action data store 322, and model data store 323. The data stores 320-323 may include one or more databases, data structures, or the like for storing and/or retaining information associated with the UAV 200 or a group of UAVs. Sensor data store 320 may be configured to store any suitable sensor data collected by the UAV 200 or any suitable UAV managed by the ground management system 302. For example, sensor data store 320 may include and suitable sensor data collected by the sensor system 201 of FIG. 2. In some embodiments, this sensor data may include historical sensor data collected during performance of past missions.

In some embodiments, the mission data store 321 may be configured to store any suitable mission data associated mission performed (or to be performed) by the UAV 200 or any suitable UAV managed by the ground management system 302. Mission data may include route information, order information, item information, source location, destination location, and the like. The corrective action data store 322 may be configured to a protocol for identifying one or more corrective actions based on a suitable combination of sensor data, mission data, and a predicted state of a UAV (e.g., the output provided by predictive models 126 of FIG. 1). The model data store 323 may be configured to store one or more predictive models. The predictive models stored in the model data store 323 may include predictive models that have been generated based on historical mission data and/or corresponding historical sensor data of a group of UAVs (including, or not including the UAV 200).

FIG. 3 further illustrates components of an onboard computer 303 of the UAV 200. The onboard computer 303 may include at least one memory 332 and one or more processing units (or processor(s)) 334. The processor(s) 334 may be implemented as appropriate in hardware, computer-executable instructions, software, firmware, or combinations thereof. Computer-executable instruction, software, or firmware implementations of the processor(s) 334 may include computer-executable or machine-executable instructions written in any suitable programming language to perform the various functions described. The memory 332 may include more than one memory and may be distributed throughout the onboard computer 303. The memory 332 may store program instructions (e.g., a management module 330, onboard prognostics module 333, etc.) that are loadable and executable on the processor(s) 334, as well as data generated during the execution of these programs. Depending on the configuration and type of memory, the memory 332 may be volatile (such as random access memory (RAM)) and/or non-volatile (such as read-only memory (ROM), flash memory, or other memory).

The onboard computer 303 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 332 may include multiple different types of memory, such as static random access memory (SRAM), dynamic random access memory (DRAM), or ROM.

In some examples, the onboard computer 303 may also include additional storage 336, which may include removable storage and/or non-removable storage. The additional storage 336 may include, but is not limited to, magnetic storage, optical disks, and/or tape storage. The disk drives and their associated computer-readable media may provide non-volatile storage of computer-readable instructions, data structures, program modules, and other data for the computing devices.

The memory 332 and the additional storage 336, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. The modules of the computer system may include one or more components.

Turning to the contents of the memory 332 in more detail, the memory 332 may include an operating system 338 and one or more application programs, modules or services for implementing the features disclosed herein including at least the management module 330 and the onboard prognostics module 333. In at least one embodiment, the onboard prognostics module 333 may be executed as part of the management module 330. The management module 330 may be configured to provide flight operation management functions and/or to manage operations of different components to deliver an item. In an example, the management module 330 may operate autonomously or independently of the management module 310 of the ground management system 302. In another example, the management module 330 may operate semi-autonomously or be fully controlled by the management module 310.

The computer system may also include I/O device(s) 339 (e.g., interfaces, ports) such as for enabling connection with the ground management system 302. The I/O device(s) 339 may also enable communication with the other components and systems of the UAV 200 (e.g., a propulsion system, GPS receiver, navigation sensors, imaging sensors, etc.).

The onboard computer 303 may also include sensor data store 340, mission data store 341, corrective action data store 342, and model data store 343. The data stores 340-343 may include one or more databases, data structures, or the like for storing and/or retaining sensor data associated with the UAV 200. For example, sensor data store 340 may include and suitable sensor data collected by the sensor system 201 of FIG. 2. In some embodiments, this sensor data may include historical sensor data collected by the sensor system 201 of UAV 200 during performance of past missions.

In some embodiments, the mission data store 341 may be configured to store any suitable mission data associated missions performed (or to be performed) by the UAV 200. Mission data may include route information, order information, item information, source location, destination location, and the like. The corrective action data store 342 may be configured to store corrective action data for identifying one or more corrective actions based on a suitable combination of sensor data, mission data, and a predicted state of the UAV 200. The model data store 343 may be configured to store one or more predictive models. The predictive models stored in the model data store 343 may include predictive models that have been generated based on historical mission data and/or corresponding historical sensor data of the UAV 200 and/or a group of UAVs (including, or not including the UAV 200).

Figure 4:
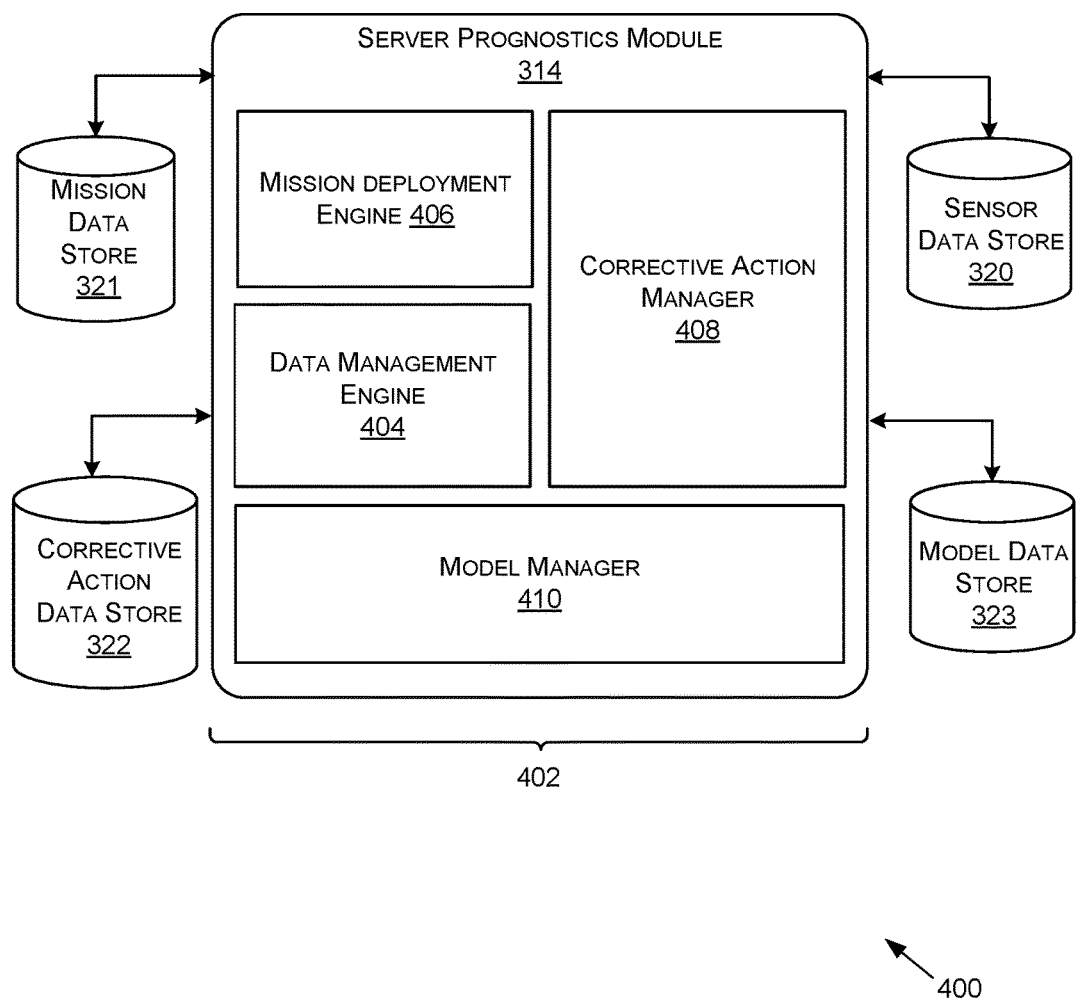
FIG. 4 schematically illustrates an example computer architecture for the server prognostics module of FIG. 3, including a plurality of modules that may perform functions in accordance with at least one embodiment.

FIG. 4 schematically illustrates an example computer architecture 400 for the server prognostics module 314 of FIG. 3, including a plurality of modules 402 that may perform functions in accordance with at least one embodiment. The modules 402 may be software modules, hardware modules, or a combination thereof. If the modules 402 are software modules, the modules 402 can be embodied on a computer-readable medium and processed by a processor in any of the computer systems described herein. It should be noted that any module or data store described herein, may be, in some embodiments, a service responsible for managing data of the type required to make corresponding calculations. The modules 402 may be configured in the manner suggested in FIG. 4 or the modules 402 may exist as separate modules or services external to the server prognostics module 314.

In the embodiment shown in the drawings, the sensor data store 320, the mission data store 321, the corrective action data store 322, and the model data store 323 are shown, although data can be maintained, derived, or otherwise accessed from various data stores, either remote or local to the server prognostics module 314, to achieve the functions described herein. In at least one embodiment, the data stores 320-323 described herein may be physically located on, or accessible to, a ground management system (e.g., the ground management system 302 of FIG. 3). Modules 402 may include data management engine 404, mission deployment engine 406, corrective action manager 408, and model manager 410. Some functions of the modules 404, 406, 408, and 410 are described below. However, for the benefit of the reader, a brief, non-limiting description of each of the modules is provided in the following paragraphs.

In accordance with at least one embodiment, the data management engine 404 may be configured to receive and/or transmit any suitable data for performing the operations discussed in connection with the server prognostics module 314. For example, the data management engine 404 may be configured to receive mission data from the service provider computer(s) 105 of FIG. 1, from the UAV 200, or from another suitable UAV managed by the ground management system 302. The mission data may include item information, route information, navigation information, source location, destination location, or the like. In some examples, the mission data may correspond to missions for delivering an item purchased via an electronic marketplace. Upon receipt of the mission data, the data management engine 404 may be configured to store the mission data in the mission data store 321, a data store configured to store such information. Mission data received from the service provider computer(s) 105 may pertain to missions not yet performed, while mission data received from a UAV (e.g., the UAV 200) may pertain to missions currently being performed or past missions performed by the UAV.

The data management engine 404 may be configured to receive historical mission performance data associated with any suitable UAV managed by the ground management system 302. The historical mission performance data may mission data, sensor data (e.g., collected from any suitable combination of the sensors of a UAV), failure prediction(s), and/or corrective action performed in response to the failure prediction(s), or any suitable combination of the above. Upon receipt, or at another suitable time, the data management engine 404 may be configured to store portions of the historical mission performance data in the mission data store 321, the sensor data store 320, and the corrective action data store 322. For example, historical mission data may be stored in the mission data store 321. Historical sensor data may be stored in the sensor data stores 320, Historical failure predictions and historical corrective actions may be stored in the corrective action data store 322. In some embodiments, the data stores 320-323 may be combined in a single storage location where historical mission performance data may be stored.

The data management engine 404 may be configured to receive predetermined corrective action data and provide such data to the corrective action manager 408. The predetermined corrective action data may specify one or more corrective actions (e.g., send a notification, conduct an unscheduled landing, return to source location, request instructions, request remote control, etc.) to be performed based, at least in part, on particular mission data, sensor data, UAV specification information, and item information, or any suitable combination of the above. Upon receipt, or at another suitable time, the corrective action manager 408 may be configured to store the corrective action data in the corrective action data store 322, a data store configured to store such information.

In some embodiments, the correction action data may be generated by the corrective action manager 408 based on historical mission performance data (e.g., historical mission data, historical sensor data, historical failure predictions, historical corrective actions performed, etc.) of a collection of UAVs. Using the historical mission performance data, the corrective action manager 408 may be configured to generate a list of corrective actions historically taken by UAVs in response to failure predictions and/or failures experienced during previous missions. In some embodiments, the corrective action manager 408 may be configured to calculate success scores for the corrective actions based on many factors including, but not limited to: damage to the UAV sustained as a result of performing the corrective action, damage to the item sustained as a result of performing the corrective action, damage to person(s) sustained as a result of performing the corrective action, and/or damage to property sustained as a result of performing the corrective action. The historical mission performance data, corrective actions, and success scores may be stored as corrective action data within the corrective action data store 322.

In some embodiments, the model manager 410 may be configured to maintain any suitable number of predictive models for any suitable number of systems/subsystems. The output (e.g., a failure prediction) of these predictive models may indicate a future state of a system/subsystem. A state may include a time of failure, a type of failure, a likelihood that the failure occurs by or before the time of failure, or the like. In some embodiments, the model manager 410 may utilize historical mission performance data of a collection of UAVs to train a predictive model. For example, the historical mission performance data may indicate that a failure occurred, or a failure may be deduced from the historical mission performance data. The predictive model may be trained to identify relationships between variables of the historical mission performance data (and/or values of the input variables) and a particular outcome (e.g., a particular type of failure, a time within which the failure occurred, etc.). Once trained, the predictive model may be configured to provide a failure prediction using current mission performance data of the UAV.

In some embodiments, the model manager 410 may be configured to generate a predictive model that includes a Bayesian Belief Network (BBN). A Bayesian Belief Network, also known as a Bayesian network, Bayesian net, belief network, causal network, or influence diagram, may combine Bayesian inference with graph theory to model a complex system. Bayesian inference is a mathematical framework for updating the belief of an event when new information related to dependent events becomes available. Specifically, Bayes rule relates the prior probability of a random event with the likelihood obtained from experimental evidence in order to determine the posterior probability. By utilizing a BBN, exact historical data may not necessary to provide an effective output despite uncertainties in the input data. In some embodiments, the model manager 410 may generate a BBN to represent a probabilistic model of all the variables corresponding to performing a mission plan (e.g., delivering an item). Such variables may include mission data, UAV specification information (e.g., including information pertaining to the subsystems of the UAV), item information, collected sensor data, navigation data, GPS data, corrective actions performed, or the like. The model manager 410 may utilize the BBN to determine a probability value (e.g., 90%) that a failure will occur in a particular subsystem within some period of time (e.g., five minutes). The model manager 410 may continuously or periodically update the predictive model (e.g., the BBN) as new sensor data is collected.

In some embodiments, the model manager 410 may generate a predictive model based on techniques associated with the concept of physics of failure. Physics of failure techniques leverage knowledge and understanding of processes and mechanisms that induce failure to predict device performance. The model manager 410 may generate a predictive model utilizing degradation algorithms associated with physics of failure that describe how physical, chemical, mechanical, thermal, and/or electrical mechanism evolve over time and eventually induce failure. In at least some embodiments, the output provided by such a predictive model may indicate, based on information known about how components of a subsystem (e.g., the propulsion system 218) degrade over time, a failure prediction indicating a likelihood that a subsystem will fail within a specific period of time (e.g., within ten minutes, between eight and ten minutes, in 365 days, etc.).

In some embodiments, the model manager 410 may generate multiple predictive models for each subsystem. One model may be generated using a BBN based on variables associated only the UAV 200. Another model may be generated using a BBN based on variables associated with a collection of UAVs. Still another model may be generated using physics of failure techniques. Yet another model may be generated utilizing supervised learning techniques in which the model is trained using historical information and known outcomes to learn correlations between input values. It should be appreciated that any suitable number of predictive models may be generated for a subsystem utilizing any suitable model generation technique.

In some embodiments, the model manager 410 may be configured to receive (e.g., at completion of a mission, during performance of the mission, or at any suitable time) historical mission performance data associated with a UAV. The model manager 410 may receive such information from the data management engine 404 or directly from a UAV. The model manager 410 may be configured to utilize the historical mission performance data to retrain/update one or more predictive models stored in the model data store 323. The updated models may then be utilized by other modules of the server prognostics module 314 to perform additional operations. For example, the mission deployment engine 406 (discussed further below) may provide the updated predictive models to UAVs for use during execution of future missions.

The mission deployment engine 406 may be configured to provide mission data for a mission to a UAV selected to perform the mission. In some embodiments, the mission deployment engine 406 may be configured to provide the UAV with one or more predictive models (e.g., from the model data store 323, corrective action data (from the corrective action data store 322), and historical mission performance data (obtained from any suitable combination of the mission data store 321, the sensor data store 320, and the corrective action data store 322).

Utilizing the modules 402 as described above, the server prognostics module 314 may provide a UAV with any suitable data for performing the operations discussed in connection with the onboard prognostics module 333.

Figure 5:
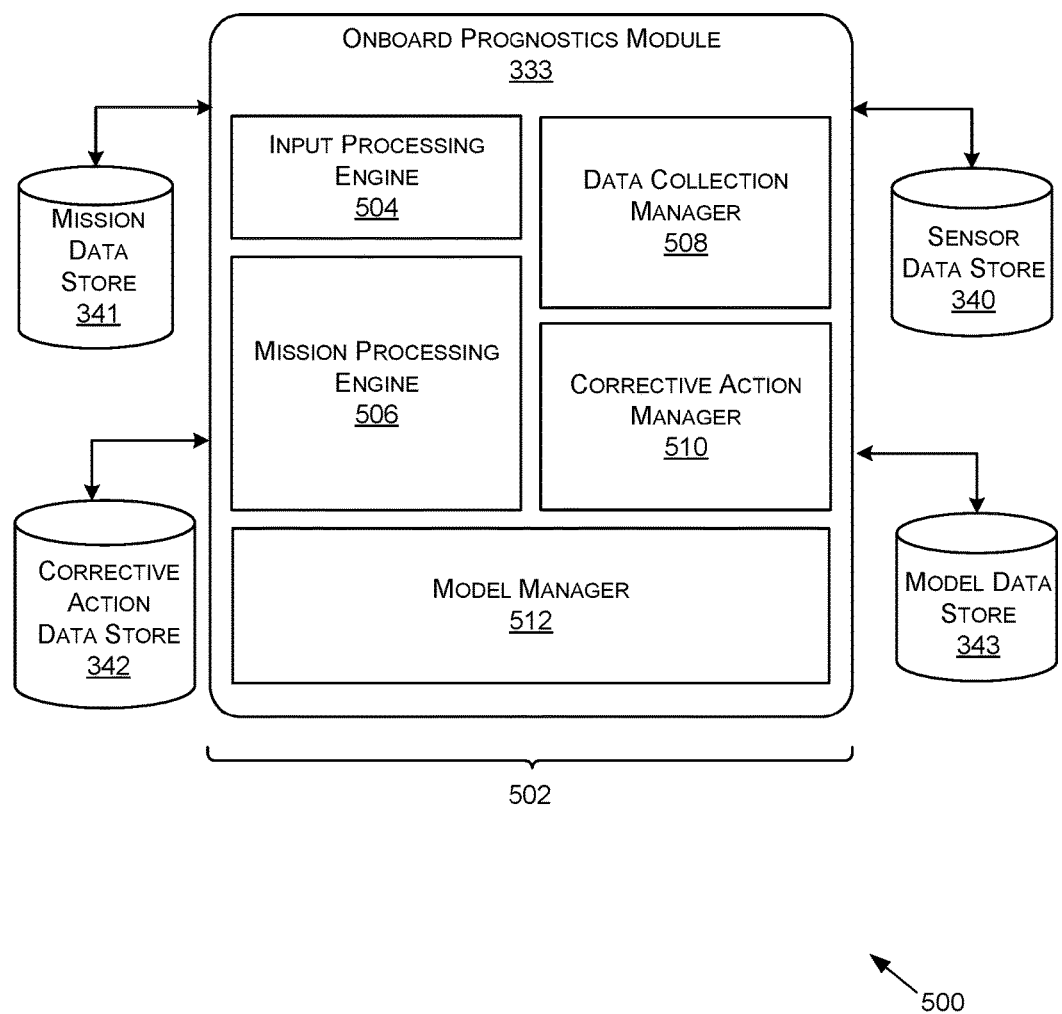
FIG. 5 schematically illustrates an example computer architecture for the onboard prognostics module of FIG. 3, including a plurality of modules that may perform functions in accordance with at least one embodiment.

FIG. 5 schematically illustrates an example computer architecture 500 for the onboard prognostics module 333 of FIG. 3, including a plurality of modules 502 that may perform functions in accordance with at least one embodiment. The modules 502 may be software modules, hardware modules, or a combination thereof. If the modules 502 are software modules, the modules 502 can be embodied on a computer-readable medium and processed by a processor in any of the computer systems described herein. It should be noted that any module or data store described herein, may be, in some embodiments, a service responsible for managing data of the type required to make corresponding calculations. The modules 502 may be configured in the manner suggested in FIG. 5 or the modules 502 may exist as separate modules or services external to the onboard prognostics module 333.

In the embodiment shown in the drawings, the sensor data store 340, the mission data store 341, the corrective action data store 342, and the model data store 343 of FIG. 3 are shown, although data can be maintained, derived, or otherwise accessed from various data stores, either remote or local to the onboard prognostics module 333, to achieve the functions described herein. In at least one embodiment, the data stores described herein may be physically located on a UAV (e.g., the UAV 200). Modules 502 may include input processing engine 504, mission processing engine 506, data collection manager 508, corrective action manager 510, and model manager 512. Some functions of the modules 504, 506, 508, 510, and 512 are described below. However, for the benefit of the reader, a brief, non-limiting description of each of the modules is provided in the following paragraphs.

In accordance with at least one embodiment, the input processing engine 504 may be configured to receive and/or obtain any suitable data (e.g., from the server prognostics module 314 of FIG. 43) for performing the operations discussed in connection with the onboard prognostics module 333. For example, the input processing engine 504 may be configured to receive mission data (e.g., from the ground management system 302 of FIG. 3) including item information, route information, navigation information, source location, destination location, or the like. In some examples, the mission data may correspond to a mission assigned to the UAV 200 for delivering an item purchased via an electronic marketplace. The input processing engine 504 may be configured to store the mission data in the mission data store 341, a data store configured to store such information.

The input processing engine 504 may be configured to receive historical mission performance data associated with any suitable UAV managed by the ground management system 302. The historical mission performance data may mission data, sensor data (e.g., collected from any suitable combination of the sensors of a UAV), failure prediction(s), and/or corrective action performed in response to the failure prediction(s), or any suitable combination of the above. Upon receipt, or at another suitable time, the input processing engine 504 may be configured to store portions of the historical mission performance data in the mission data store 341, the sensor data store 340, and the corrective action data store 342. For example, historical mission data may be stored in the mission data store 341. Historical sensor data may be stored in the sensor data stores 340, Historical failure predictions and historical corrective actions may be stored in the corrective action data store 342. In some embodiments, the data stores 340-343 may be combined in a single storage location where historical mission performance data may be stored.

The input processing engine 504 may be configured to receive corrective action data (e.g., from the server prognostics module 314). The corrective action data may include a protocol for determining a corrective action from a group of potential corrective actions. The protocol may specify one or more corrective actions to be performed based, at least in part, on particular mission data, sensor data, UAV specification, and item information, or any suitable combination of the above. Upon receipt, or at another suitable time, the input processing engine 504 may be configured to store the corrective action data in the in the corrective action data store 342, a data store configured to store such information.

In some embodiments, the correction action data may be generated by the corrective action manager 510 based on historical mission performance data (e.g., historical mission data, historical sensor data, historical failure predictions, historical corrective actions performed, etc.) of a collection of UAVs and/or the UAV 200. Using the historical mission performance data, the corrective action manager 510 may be configured to generate a list of corrective actions historically taken by UAVs (or the UAV 200) in response to failure predictions and/or failures experienced during previous missions. In some embodiments, the corrective action manager 510 may be configured to calculate success scores for the corrective actions based on many factures including, but not limited to: damage to the UAV sustained as a result of performing the corrective action, damage to the item sustained as a result of performing the corrective action, damage to person(s) sustained as a result of performing the corrective action, and/or damage to property sustained as a result of performing the corrective action. The historical mission performance data, corrective actions, and success scores may be stored as corrective action data within the corrective action data store 322.

The input processing engine 504 may be configured to receive model data (e.g., from the server prognostics module 314). The model data may include one or more predictive models configured to generate output based on inputted sensor data (e.g., sensor data collected by the sensor system 201 of the UAV 200). Each predictive model may be associated with a subsystem of a UAV (e.g., the UAV 200). The output of each predictive model may provide an indication that a failure of the corresponding subsystem is likely to occur (e.g., with some calculated certainty such as 70% certain, 95% certain, etc.) within a calculated period of time (e.g., five minutes, one hour, three years, etc.). Upon receipt, or at another suitable time, the input processing engine 504 may be configured to store the model data in the in the model data store 343, a data store configured to store such information. In some embodiments, the model data may be predetermined or the model data may be generated (e.g., by the server prognostics module 314) based on historical mission performance data of a collection of UAVs and/or the UAV. In addition to received model data, the model data store 343 may be configured to store model data corresponding to predictive models generated by the model manager 512.

In some embodiments, the model manager 512 may be configured to generate one or more predictive models for each subsystem. Any of the model generation techniques (e.g., BBN, Physics of failure, supervised learning, etc.) discussed above in connection with the model manager 412 of FIG. 4 may be utilized to generate these models. The output (e.g., a failure prediction) of these predictive models may indicate a future state of a system/subsystem. A state may include a time of failure, a type of failure, a likelihood that the failure occurs by or before the time of failure, or the like.

In some embodiments, the model manager 512 may be configured to receive (e.g., at completion of a mission, during performance of the mission, or at any suitable time) historical mission performance data associated with a UAV. The model manager 512 may receive such information from the data collection manager 508 or directly from a UAV. The model manager 512 may be configured to utilize the historical mission performance data to retrain/update one or more predictive models stored in the model data store 343. The updated models may then be utilized by other modules of the onboard prognostics module 333 to perform additional operations.

The mission processing engine 506 may be configured to receive mission data for a mission assigned to the UAV 200. The mission processing engine 506 may analyze the mission data to identify and/or determine a set of operations (e.g., a mission plan) for performing the mission. In some embodiments, the mission processing engine 506 may be configured to identify a number of stages of the mission plan. The mission data may identify these stages, or the mission processing engine 506 may group sets of instructions according to a predefined scene. For example, the mission processing engine 506 may group operations related to takeoff and associated those operations with a common stage. Similarly, the mission processing engine 506 may identify groups of operations corresponding to initiating propulsion, performing inflight operations, landing, delivery, or the like. Each group of operations may be associated with a corresponding stage of the mission plan.

In some embodiments, the mission processing engine 506 may be configured to associate a stage with one or more subsystems of the UAV 200. As a non-limiting example, a takeoff stage may be associated with the propulsion system 218, the structure system (e.g., frame 226 and/or landing structure 222), and the power system 207 of FIG. 2 based on a determination that those subsystems are required to perform the set of operations corresponding to the takeoff stage. The mission processing engine 506 may store associations between the mission, the stage(s), and the subsystems corresponding to the stage(s) as part of the mission data stored in the mission data store 341.

In some embodiments, the mission processing engine 506 may be configured to detect a set of operations being executed by the UAV (e.g., the UAV 200). In response to this detection, the mission processing engine 506 may consult the stored associations contained in the mission data store 341 to determine the stage being performed and the subsystem(s) associated with the stage being performed. Once the stage and subsystem(s) are determined, the mission processing engine 506 may be configured to trigger functionality related to the data collection manager 508.

In some embodiments, the data collection manager 508 may be configured to receive an indication (e.g., from the mission processing engine 506) to initiate sensor data collection by one or more sensors (e.g., one or more sensors of the sensor system 201). The data collection manager 508 may interface directly with the one or more sensors and/or the data collection manager 508 may communicate with the management module 330 of FIG. 3 in order to trigger sensor data collection of one or more sensors (e.g., one or more sensors of the sensor system 201 of FIG. 2). The data collection manager 508 may be configured to receive sensor data collected by one or more sensors (e.g., some combination of the sensors of the sensor system 201 on the UAV 200). Upon receipt, or at another suitable time, the data collection manager 508 may be configured to store the collected sensor data in the sensor data store 340. In some embodiments, the data collection manager 508 may be configured to provide the collected sensor data to any suitable module of the onboard prognostics module 333. As a non-limiting example, the data collection manager 508 may provide collected sensor data to the model manager 512. Receipt of the collected sensor data may cause the model manager 512 to perform operations to update/retrain any suitable number of predictive models managed by the model manager 512.

In some embodiments, the data collection manager 508 may be configured to provide collected sensor data to a remote system (e.g., the ground management system 302 of FIG. 3). The data collection manager 508 may obtain any suitable mission performance data (e.g., sensor data, navigation data, GPS data, failure predictions, corrective actions taken, or the like) during the mission. Such data may be provided by the data collection manager 508 to the remote system during performance of the mission, upon completion of the mission, or at any suitable time.

In some embodiments, the mission processing engine 506 may be further configured to obtain collected sensor data (e.g., from the data collection manager 508, from the sensor data store 340, etc.). The mission processing engine 506 may identify (e.g., from stored mission data) one or more predictive models corresponding to a particular subsystem currently being utilized to perform a stage of the mission. In some embodiments, the mission processing engine 506 may be configured to provide the collected sensor data as input for the one or more predictive model(s).

In some embodiments, the mission processing engine 506 may be configured to receive an output from a predictive model that indicates that a subsystem has some likelihood of experiencing a failure within a period of time. One illustrative output may indicate that the propulsion system 218 may be 90% likely to fail (e.g., fall below some performance threshold) within five minutes time. In some cases, the mission processing engine 506 may receive multiple, potentially conflicting, outputs from any suitable number of predictive models. As a non-limiting example, a predictive model generated from historical data of the UAV may generate output indicating that the propulsion system 218 is 50% likely to fail with five minutes, while a predictive model generated from historical data of a collection of UAVs may generate output indicating that the propulsion system 218 is 90% likely to fail in three minutes. In some cases, the mission processing engine 506 may be configured to weigh the outputs according to a predetermined scheme. For example, output of models corresponding to the UAV 200 may be weighted more heavily than outputs of models corresponding to a collection of UAVs. In other embodiments, a worst case output may override other outputs provided. In the example provided above, the worst case output may be that the propulsions is 90% likely to fail within three minutes. Accordingly, the worst case output may be utilized by the mission processing engine 506 for performing additional operations.

In some embodiments, the mission processing engine 506 may determine that an output indicates a failure is likely to occur within a time period needed to perform the mission. In some embodiments, the mission processing engine 506 may ignore output that does not indicate a likelihood above a predetermined threshold. For example, if an output indicates under a 50% likelihood (or another suitable threshold) that a failure is to occur, the mission processing engine 506 may ignore the output and perform no further processing. The mission processing engine 506 may be configured to trigger functionality of the corrective action manager 510 in response to receiving one or more outputs of one or more predictive models.

The corrective action manager 510 may be configured to obtain mission data, sensor data, and failure prediction(s) (e.g., outputs of one or more predictive models). In some embodiments, the mission data, sensor data, and failure predictions, may be provided by the mission processing engine 506. Upon receipt, the corrective action manager 510 may access corrective action data from the corrective action data store 342. The corrective action manager 510 may be configured to determine a particular corrective action from the corrective action data. For example, mission data (e.g., the item information, source location, destination location, UAV specification information), sensor data (e.g., collected by the sensors system 201 and pertaining to the propulsion system 218), and failure predictions (e.g., indicating a 90% likelihood that the propulsion system 218 will experience a failure in two minutes) may be utilized to determine a corrective action.

In one non-limiting example, the corrective action manager 510 may determine a number of potential corrective actions from the corrective action data stored in the corrective action data store 342. The potential corrective actions may be determine by comparing current mission/sensor data to historical mission performance data associated and stored with the corrective action data. The comparison may result in a similarity score being determined for each corrective action. If the current mission/sensor data closely resembles (e.g., the values match exactly or within a threshold range, over a threshold number of attributes of the current data matches the historical data, etc.) the historical mission performance data, a higher similarity score may result than when the current mission/sensor data does not closely resemble the historical mission performance data.

In some embodiments, the corrective action manager 510 may be configured to identify corrective actions having a similarity score above a threshold (e.g., 75% similar, 90% similar, etc.) as a potential corrective action. The corrective action manager 510 may be configured to calculate a success score for the potential corrective actions identified. A success score may be calculated based on a comparison of the historical mission performance data collected prior to the performance of the potential corrective action and historical mission performance data collected after the performance of the potential corrective action. A higher success score may be calculated when the comparison indicates a measure of improvement or indicates that the situation was not worsened by performance of the corrective action. By way of example, the historical mission performance data may indicate that performance of one corrective action resulted in damage to the UAV and the item carried. Accordingly, the success score for this corrective action may be lower than a corrective action that resulted in no additional damage to the UAV and for which the item remained undamaged.

In some embodiments, the corrective action manager 510 may be configured to select one or more corrective actions to be performed based on the success scores. By way of example, a highest, or a number of highest scored corrective actions may be selected. In some embodiments, the corrective action manager 510 may be configured to communicate with other components of the UAV 200 (e.g., the management module 330 of FIG. 3) in order to cause the selected corrective action(s) to be performed (e.g., by the UAV 200).

Figure 6:
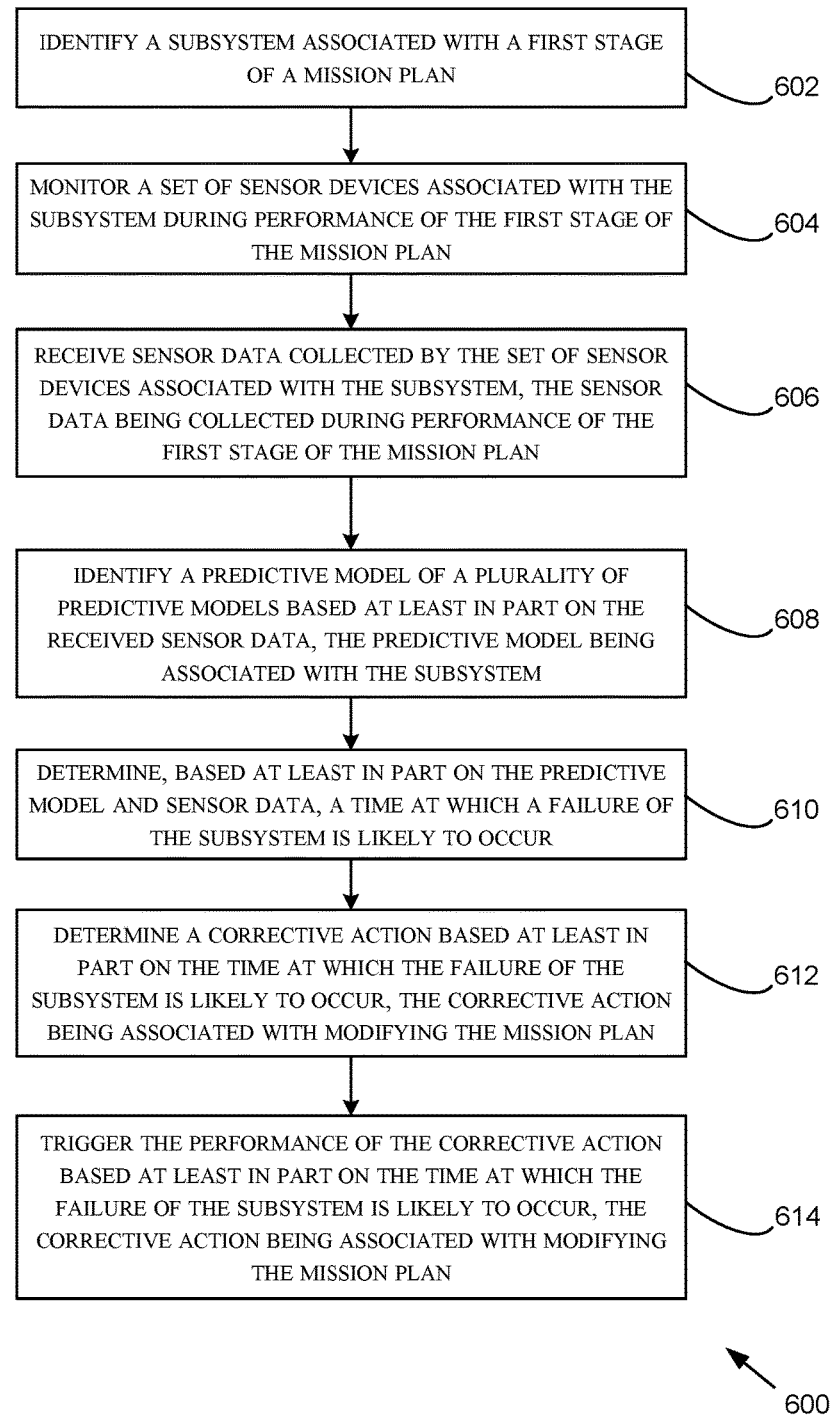
FIG. 6 illustrates a flow for an exemplary method for determining a corrective action to be performed, according to embodiments.

FIG. 6 illustrates a flow for an exemplary method 600 for causing a corrective action to be performed, according to embodiments. The steps of the method 600 may be performed in any suitable order, not necessarily in the order depicted in FIG. 6. The method may be performed by a UAV comprising one or more subsystems to at least generate lift and facilitate flight of the UAV, one or more sensor devices associated with at least one of the one or more subsystems, and one or more memories configured to store a mission plan and a plurality of predictive models. In some embodiments, the mission plan may comprise at least one stage corresponding to a set of operations for executing the at least one stage of the mission plan. In some embodiments, the plurality of predictive models may be individually associated with a particular subsystem of the one or more subsystems. The UAV may further comprise an onboard prognostics module communicatively coupled with the one or more subsystems and one or more sensor devices and configured to perform the operations of method 600.

The method 600 may begin at 602, where a subsystem associated with a first stage of the mission plan may be identified. The mission plan may be determined (e.g., by the mission processing engine 506 of FIG. 5) based on mission data provided by a ground management system (e.g., the ground management system 104 of FIG. 1). In some embodiments, the mission plan may include a set of operations required to execute a mission (e.g., delivery of an item by the UAV 200). Stages of the mission plan (e.g., the first stage) may correspond to a subset of the operations of the mission plan. In some embodiments, a stage (e.g., the first stage) of the mission plan may be associated with one or more subsystems of the UAV 200. For example, a stage (e.g., the first stage) of the mission plan may be associated with one or more subsystems to be utilized to perform the subset of operations corresponding the stage.

At 604, a set of sensor device associated with the subsystem may be monitored during performance of the first stage of the mission plan. For example, the set of devices associated with a subsystem may be identified (e.g., by the data collection manager 508). Once identified, the set of sensors may be monitored (e.g., by the data collection manager 508) in order to receive/obtain sensor data collected by the set of sensors. As a non-limiting example, the set of sensors may include one or more sensors of the sensor system 201 of FIG. 2.

At 606, sensor data collected by the set of sensor devices associated with the subsystem may be received. In some embodiments, the sensor data may be collected (e.g., by the set of sensor devices identified at 604) during performance of the first stage of the mission plan. The sensor data may include any suitable combination of information related to temperature, humidity, stress, strain, structural integrity, vibration, external forces, electrical current, voltage, rotations per minute, or the like.

At 608, a predictive model of the plurality of predictive models may be identified (e.g., by the mission processing engine 506) based at least in part on the received sensor data. In at least one embodiment, the predictive model being associated with the subsystem. By way of example, the mission processing engine 506 may identify the predictive model from the plurality of predictive models (e.g., stored in model data store 343) based on an association between the predictive model and the subsystem.

At 610, a time at which a failure of the subsystem is likely to occur may be determined (e.g., by the mission processing engine 506). In at least one embodiment, the time may be determined based at least in part on the predictive model identified at 610 and the sensor data received at 608. In some embodiments, the sensor data received at 606 may be used as input for the predictive model identified at 608. The predictive model may provide output to the mission processing engine 506. The output provided by the predictive model may indicate the time at which the failure of the subsystem is likely to occur.

At 612, performance of a corrective action may be triggered (e.g., caused) based at least in part on the time at which the failure of the subsystem is likely to occur. In some embodiments, the corrective action may be associated with modifying the mission plan. By way of example, the corrective action manager 510 may identify the corrective action to be performed as described above in connection with FIG. 5. Once identified, the corrective action manager 510 may communicate directly with the UAV 200, or with the management module 330 of FIG. 3 in order to cause the UAV 200 to perform the corrective action.

Figure 7:
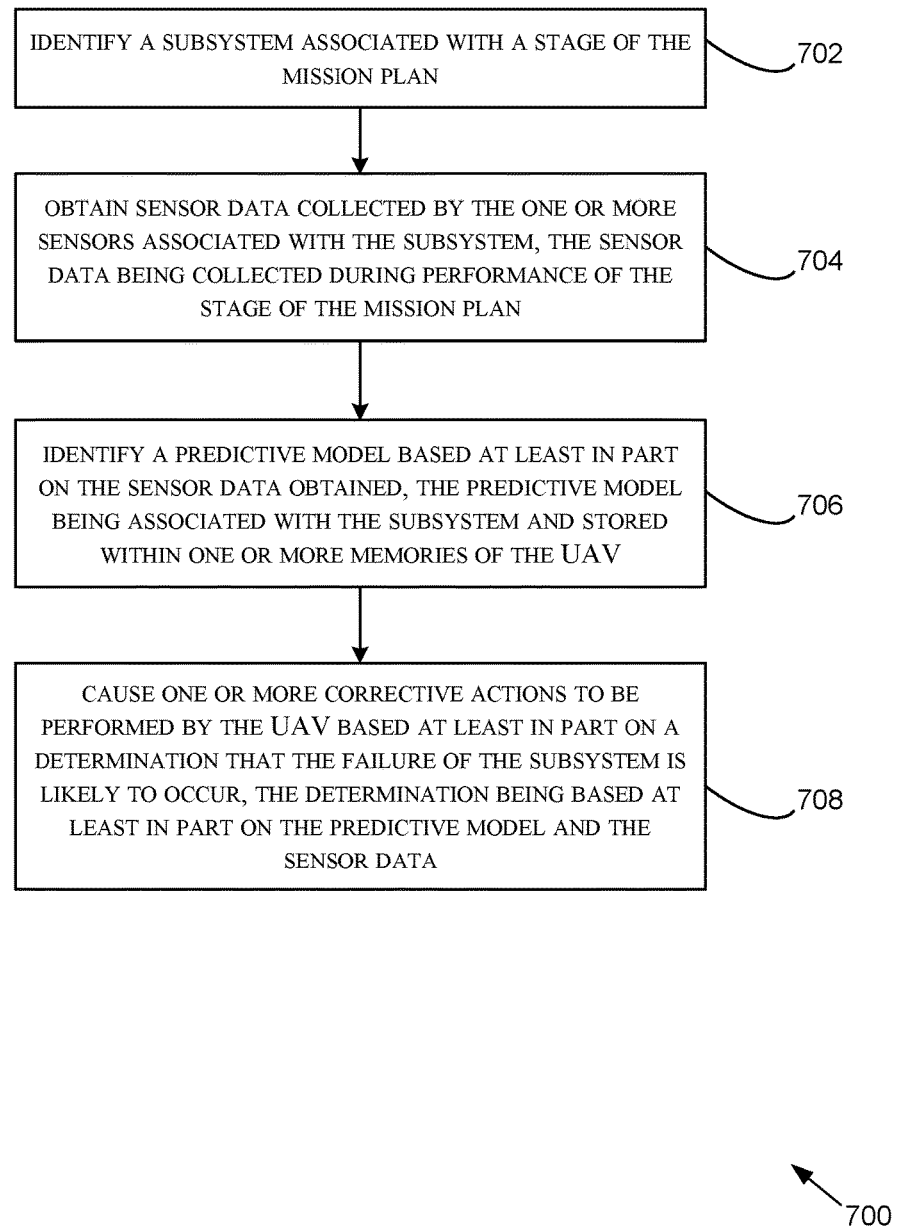
FIG. 7 illustrates a flow for an exemplary method for causing a corrective action to be performed, according to embodiments.

FIG. 7 illustrates a flow for another exemplary method 700 for causing a corrective action to be performed, according to embodiments. In at least one embodiment, one or more computer-readable media may comprise instructions that, when executed by an onboard prognostics module of an unmanned aerial vehicle (UAV), cause the onboard prognostics module to perform the operations of method 700.

The method 700 may begin at 702, where a subsystem of the UAV is identified (e.g., by the mission processing engine 506 of FIG. 5). In at least one embodiment, the subsystem may be associated with a stage of the mission plan. The mission plan and the stage may be determined by the mission processing engine 506 as described above in connection with FIG. 5.

At 704, sensor data collected by the one or more sensors associated with the subsystem may be obtained (e.g., by the data collection manager 508 of FIG. 5). In some embodiments, the sensor data may be collected during performance of the stage of the mission plan.

At 706, a predictive model may be identified (e.g., by the mission processing engine 506) based at least in part on the sensor data obtained. In some embodiments, the predictive model may be associated with the subsystem and stored within one or more memories of the UAV (e.g., the model data store 343).

At 708, one or more corrective actions may be caused to be performed (e.g., by the UAV 200) based at least in part on a determination that the failure of the subsystem is likely to occur. In at least one embodiment, the determination may be based at least in part on the predictive model and the sensor data. For example, the collected sensor data may be utilized as input for the predictive model. The output of the predictive model may indicate that the failure of the subsystem is likely to occur. As a non-limiting example, the output may indicate that failure of a subsystem (e.g., the propulsion system 218 of FIG. 2) is 76% likely to occur within five minutes (or at a specific time). The one or more corrective actions may be identified based on the output by, for example, the corrective action manager 510 in the manner described above in connection with FIG. 5.

Figure 8:
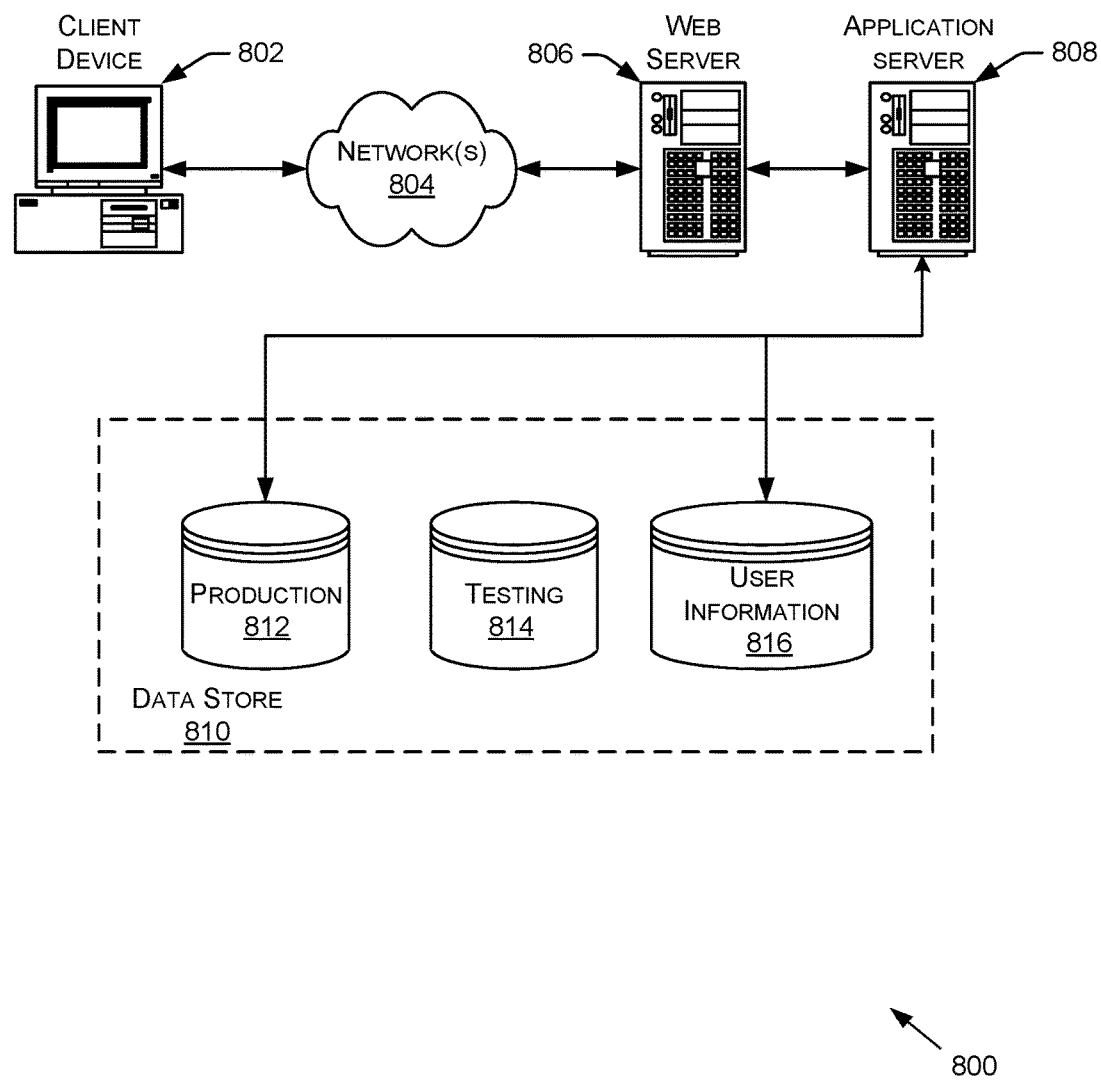
FIG. 8 illustrates an example architecture for providing a network-based resource, according to embodiments.

Turning to FIG. 8, the figure illustrates aspects of an example environment 800 capable of implementing the above-described structures and functions. As will be appreciated, although a Web-based environment is used for purposes of explanation, different environments may be used, as appropriate, to implement various embodiments. The environment includes an electronic client device 802, which may include any appropriate device operable to send and receive requests, messages, or information over an appropriate network(s) 804 and convey information back to a user of the device. Examples of such client devices include personal computers, cell phones, handheld messaging devices, laptop computers, set-top boxes, personal data assistants, electronic book readers, or any other computing device. The network(s) 804 may include any appropriate network, including an intranet, the Internet, a cellular network, a local area network or any other such network or combination thereof. Components used for such a system may depend at least in part upon the type of network and/or environment selected. Protocols and components for communicating via such a network are well known and will not be discussed herein in detail. Communication over the network may be enabled by wired or wireless connections and combinations thereof. In this example, the network includes the Internet, and the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there may be several application servers, layers, or other elements, processes or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server may include any appropriate hardware and software for integrating with the data store as needed to execute aspects of one or more applications for the client device, handling a majority of the data access and business logic for an application. The application server 808 provides access control services in cooperation with the data store 810, and is able to generate content such as text, graphics, audio files and/or video files to be transferred to the user, which may be served to the user by the Web server in the form of HTML, XML or another appropriate structured language in this example. The handling of all requests and responses, as well as the delivery of content between the client device 802 and the application server 808, may be handled by the Web server 806. It should be understood that the Web and application servers 806 and 808 are not required and are merely example components, as structured code discussed herein may be executed on any appropriate device or host machine as discussed elsewhere herein.

The data store 810 may include several separate data tables, databases or other data storage mechanisms and media for storing data relating to a particular aspect. For example, the data store 810 illustrated includes mechanisms for storing production data 812 and user information 816, which may be used to serve content for the production side. The data store 810 is also shown to include a mechanism for storing log data 814, which may be used for reporting, analysis, or other such purposes. It should be understood that there may be many other aspects that may need to be stored in the data store 810, such as for page image information and to access correct information, which may be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user, and may access the catalog detail information to obtain information about items of that type. The information then may be returned to the user, such as in a results listing on a web page that the user is able to view via a browser on the client device 802. Information for a particular item of interest may be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of environment 800 in FIG. 8 should be taken as being illustrative in nature, and not limiting to the scope of the disclosure.

The various embodiments further may be implemented in a wide variety of operating environments, which in some cases may include one or more user computers, computing devices or processing devices which may be used to operate any of a number of applications. User or client devices may include any of a number of general purpose personal computers, such as desktop or laptop computers running a standard operating system, as well as cellular, wireless and handheld devices running mobile software and capable of supporting a number of networking and messaging protocols. Such a system also may include a number of workstations running any of a variety of commercially available operating systems and other known applications for purposes such as development and database management. These devices also may include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk®. The network may be, for example, a local area network, a wide-area network, a virtual private network, the Internet, an intranet, an extranet, a public switched telephone network, an infrared network, a wireless network, and any combination thereof.

In embodiments utilizing a Web server, the Web server may run any of a variety of server or mid-tier applications, including HTTP servers, FTP servers, CGI servers, data servers, Java servers, and business application servers. The server(s) may also be capable of executing programs or scripts in response to requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also may include a computer-readable storage media reader, a communications device (e.g., a modem, a network card (wireless or wired), an infrared communication device, etc.) and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, may include any appropriate media known or used in the art, including storage media and communication media, such as, but not limited to, volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which may be used to store the desired information and which may be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not imply that certain embodiments require at least one of X, at least one of Y, or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An unmanned aerial vehicle (UAV), comprising:
    one or more subsystems to at least generate lift and facilitate flight of the UAV;
    one or more sensor devices associated with at least one of the one or more subsystems;
    one or more memories configured to store a mission plan and a plurality of predictive models, the mission plan comprising at least one stage corresponding to a set of operations for executing the at least one stage of the mission plan, the plurality of predictive models individually being associated with a particular subsystem of the one or more subsystems; and an onboard prognostics module communicatively coupled with the one or more subsystems and one or more sensor devices, wherein the onboard prognostics module is configured to:

identify a subsystem associated with a first stage of the mission plan;

monitor a set of sensor devices associated with the subsystem during performance of the first stage of the mission plan;

receive sensor data collected by the set of sensor devices associated with the subsystem, the sensor data being collected during performance of the first stage of the mission plan;

identify a predictive model of the plurality of predictive models based at least in part on the received sensor data, the predictive model being associated with the subsystem;

determine, based at least in part on the predictive model and sensor data, a time at which a failure of the subsystem is likely to occur;

determine a corrective action based at least in part on the time at which the failure of the subsystem is likely to occur, the corrective action being associated with modifying the mission plan; and trigger the performance of the corrective action based at least in part on the time at which the failure of the subsystem is likely to occur, the corrective action being associated with modifying the mission plan.

2. The unmanned aerial vehicle (UAV) of claim 1, wherein the first stage of the mission plan is related to performing flight operations using the one or more subsystems, and wherein a second stage of the mission plan is related to executing operations for delivering an item by the UAV.

3. The unmanned aerial vehicle (UAV) of claim 1, wherein the onboard prognostics module is further configured to:

store collective sensor data within the one or more memories, the collective sensor data being collected by the one or more sensor devices during performance of the mission plan;

determine that the mission plan is concluded; and transmit, to a ground management system, the collective sensor data.

4. The unmanned aerial vehicle (UAV) of claim 1, wherein the onboard prognostics module is further configured to:

maintain the plurality of predictive models, wherein each of the predictive models corresponds to a specific subsystem of the one or more subsystems, wherein each of the plurality of predictive models accepts as input particular sensor data of a subset of the one or more sensor devices, and wherein each of the plurality of predictive models provides an output that relates to failure of the specific subsystem.

5. One or more computer-readable media comprising instructions that, when executed by an onboard prognostics module of an unmanned aerial vehicle (UAV), cause the onboard prognostics module to at least:

identify a subsystem of a the UAV, the subsystem being associated with a stage of a mission plan;

obtain sensor data collected by one or more sensors associated with the subsystem, the sensor data being collected during performance of the stage of the mission plan;

identify a predictive model based at least in part on the sensor data obtained, the predictive model being associated with the subsystem and stored within one or more memories of the UAV; and cause one or more corrective actions to be performed by the UAV based at least in part on a determination that a failure of the subsystem is likely to occur, the determination being based at least in part on the predictive model and the sensor data.

6. The one or more computer-readable media of claim 5, wherein the onboard prognostics module is further configured to:

obtain a plurality of predictive models, wherein each of the predictive models corresponds to a specific subsystem of one or more subsystems;

determine that the stage of the mission plan is currently being performed;

select the predictive model from the plurality of predictive models, the selection being based on the subsystem associated with the stage;

provide, as input to the selected predictive model, the sensor data collected by the one or more sensors associated with the subsystem during performance of the stage of the mission plan; and receive output from the selected predictive model based at least in part on the input.

7. The one or more computer-readable media of claim 6, wherein the output from the selected predictive model comprises at least a time at which the predictive model predicts the failure of the subsystem is to occur, wherein the one or more corrective actions are further cased based at least in part on the time at which the predictive model predicts the failure of the subsystem is to occur.

8. The one or more computer-readable media of claim 7, wherein the output from the selected predictive model comprises at least a value indicating a likelihood that the failure occurs at the time at which the predictive model predicts the failure of the subsystem is to occur.

9. The one or more computer-readable media of claim 5, wherein at least one of the subsystems facilitates item delivery by the UAV.

10. The one or more computer-readable media of claim 6, wherein the plurality of predictive models are initially trained using historical sensor data collected from the UAV and a plurality of UAVs.

11. The one or more computer-readable media of claim 5, wherein the onboard prognostics module is further configured to:

generate an updated predictive model based at least in part on the sensor data obtained, the updated predictive model being initially generated based at least in part on historical sensor data collected by a plurality of UAVs.

12. The one or more computer-readable media of claim 5, wherein causing one or more corrective actions to be performed by the UAV further comprises:

obtaining a plurality of historical corrective actions previously performed by a plurality of UAVs;

identifying a set of potential corrective actions of the plurality of historical corrective actions based at least in part on the sensor data and output provided by the predictive model;

selecting the one or more corrective actions from the set of potential corrective actions; and transmitting data related to the one or more corrective actions to a management module of the UAV, wherein receipt by the management module causes the one or more corrective actions to be performed by the UAV.

13. A computer-implemented method, comprising:
identifying, by a computing device of an unmanned aerial vehicle (UAV), a subsystem associated with a stage of a mission plan;
monitoring, by the computing device, one or more sensors associated with the subsystem during performance of the stage of the mission plan;
receiving, by the computing device, sensor data collected by the one or more sensor;
updating, by the computing device, a predictive model based at least in part on the received sensor data, the predictive model being associated with the subsystem and stored within a memory of the UAV;
determining, by the computing device, based at least in part on the predictive model and the sensor data, a time at which a failure of the subsystem is likely to occur;
determining, by the computing device, a corrective action to perform based at least in part on the determination that the failure of the subsystem is likely to occur; and
triggering, based at least in part on the time at which the failure of the subsystem is likely to occur, the performance of the corrective action, the corrective action being associated with modifying the mission plan.

14. The computer-implemented method of claim 13, wherein the mission plan relates to facilitating flight of the UAV during an attempt to delivery an item by the UAV to a delivery location.

15. The computer-implemented method of claim 13, wherein the mission plan comprises a first stage related to generating lift of the UAV, a second stage related to propulsion of the UAV, a third stage related to landing the UAV, and a fourth stage related to delivering an item by the UAV.

16. The computer-implemented method of claim 13, wherein the predictive model comprises a Bayesian Belief Network or the predictive model is generated utilizing a physics of failure technique.

17. The computer-implemented method of claim 13, wherein UAV comprises a plurality of sensors, the plurality of sensors individually configured to collect particular sensor data associated with a particular subsystem of a plurality of subsystems of the UAV, the particular sensor data comprising at least one of external force data, stress data, strain data, structural integrity data, vibration data, temperature data, humidity data, electric current data, voltage data, and propulsion data.

18. The computer-implemented method of claim 13, further comprising:
storing the sensor data during performance of the mission plan;
providing the stored sensor data to a remote system distinct from the UAV, wherein providing the stored sensor data causes the remote system to update the predictive model using the stored sensor data; and
receiving an updated predictive model from the remote system.

19. The computer-implemented method of claim 13, wherein the predictive model is generated from historical sensor data associated with the UAV.

20. The computer-implemented method of claim 13, wherein determining the time at which the failure of the subsystem is likely to occur is further based at least in part on an additional predictive model associated with the subsystem, the additional predictive model having been generated from historical sensor data associated with a plurality of UAVs.

* * * * *